United States Patent
Serikawa

(10) Patent No.: US 6,654,352 B2
(45) Date of Patent: *Nov. 25, 2003

(54) PACKAGE GROWTH/DEGROWTH/SHIFT METHOD IN EXCHANGE

(75) Inventor: Yumiko Serikawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,369

(22) Filed: Jul. 14, 1998

(65) Prior Publication Data

US 2002/0186690 A1 Dec. 12, 2002

(30) Foreign Application Priority Data

Feb. 18, 1998 (JP) .......................................... 10-035877

(51) Int. Cl.⁷ ............................................. H04L 12/28
(52) U.S. Cl. ...................................... 370/254; 709/220
(58) Field of Search ................................ 370/217, 235, 370/253, 254, 229, 212; 709/100, 105, 226, 229, 245, 220, 221; 710/8, 10, 102, 104

(56) References Cited

U.S. PATENT DOCUMENTS

| 5,655,072 A | * | 8/1997 | Wolff ..................... 395/183.01 |
| 5,797,031 A | * | 8/1998 | Shapiro et al. ............. 395/828 |
| 5,940,586 A | * | 8/1999 | Bealkowski et al. ... 395/182.03 |

FOREIGN PATENT DOCUMENTS

| JP | 6128264 | 2/1986 |
| JP | 5227559 | 9/1993 |

* cited by examiner

*Primary Examiner*—Ajit Patel
(74) *Attorney, Agent, or Firm*—Katten Muchin Zavis Rosenman

(57) ABSTRACT

In an exchange system, conditions under which the exchange accommodates a package or module is registered in a storage unit in the exchange. Growth scenario data indicting a package type and the processes necessary for installing the packing in the exchange (package growth) is recorded in each package. When a package is newly installed in the exchange, it is determined whether the package satisfies the accommodation conditions by identifying the position at which the package is installed and the package type. If the package satisfies the accommodation conditions, a growth procedure scenario is created on the basis of the growth scenario data recorded in the package and registered in the storage portion. A package growth process is then executed in accordance with the growth procedure scenario.

13 Claims, 20 Drawing Sheets

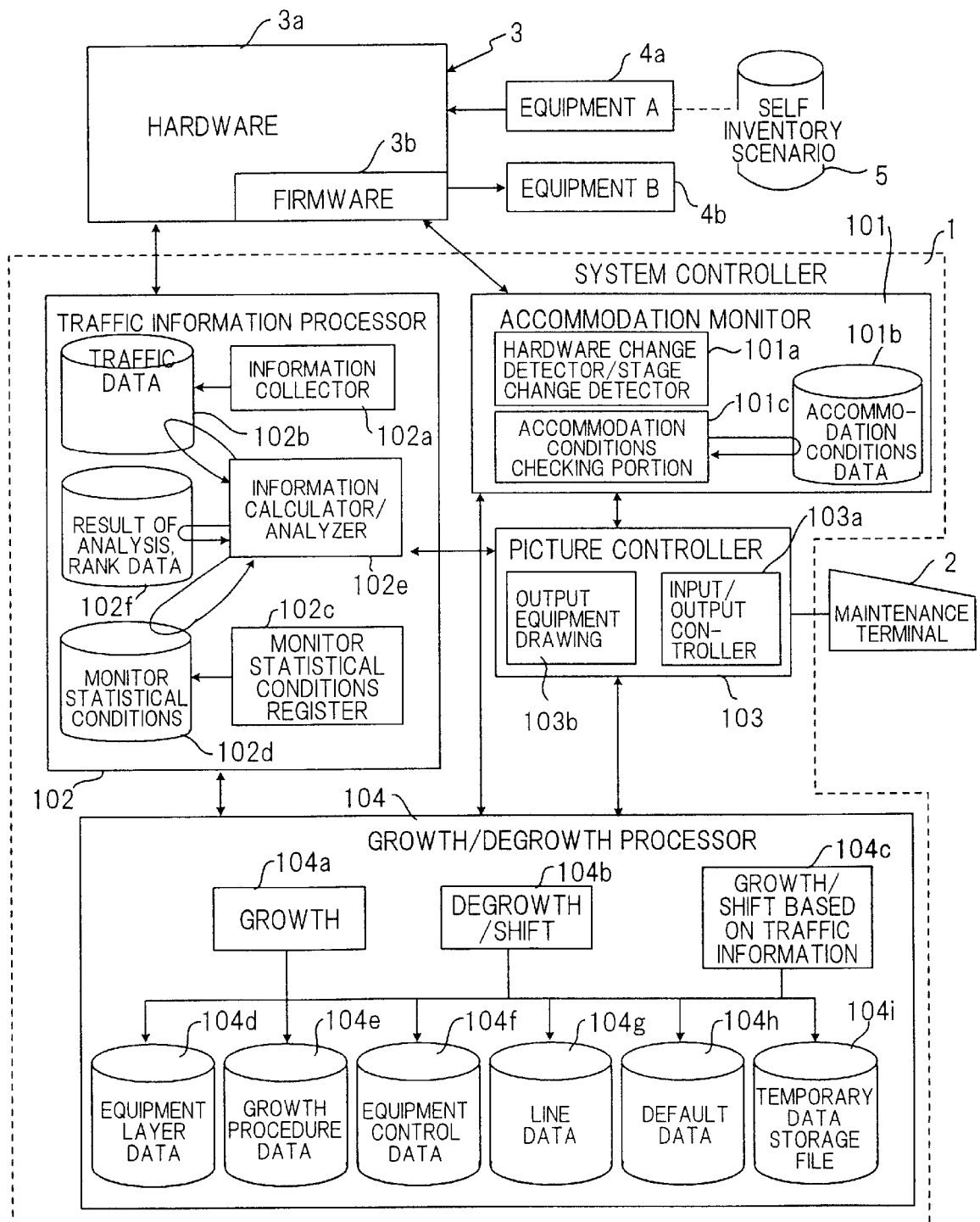

| SELF INVENTORY DATA |
|---|
| 1. PACKAGE NAME<br>    PACKAGE NAME (LINE NAME)<br>    EX.    0C3C |
| 2. PWCB NAME<br>    FORMAL NAME<br>    EX.    CLE00A |
| 3. DATE<br>    DATE OF PRODUCTION<br>    EX.    9701 |
| 4. SERIAL NUMBER<br>    EQUIPMENT NUMBER<br>    EX.    00151 |
| 5. DESIGN FIGURE NUMBER<br>    DESIGN FIGURE<br>    EX.    E16B-3026-R570 |
| 6. VERSION<br>    PACKAGE (HARDWARE) VERSION<br>    EX.    52P |

| LINE DATA |
|---|
| · POSITION AT WHICH THE PACKAGE   : ffffffsuuc<br>  FOR LINE IF IS INSTALLED |
| · SIGNAL TRANSMISSION LINE LENGTH<br>  INTRA/ SHORT/ LONG |
| · RECEPTION EXPECTANT J1 BYTE VALUE FOR PATH TRACE |
| · TRANSMISSION EXPECTANT J1 BYTE VALUE FOR PATH TRACE |
| · LOOP BACK TEST PERMISSION FOR THE OPPOSITE EQUIPMENT |
| · INTERFACE TYPE IDENTIFICATION<br>  UNI / intraNNI / interNNI |
| · ALARM PROFILE IDENTIFICATION |
| · MAXIMUM SIZE AND MAXIMUM NUMBER OF<br>  CELLS ON THE INTERFACE |
| · MAXIMUM TRANSFERABLE PHYSICAL BAND ON THE INTERFACE |
| · ACCOUNTANT IDENTIFICATION INFORMATION |

PACKAGE GROWTH/DEGROWTH/SHIFT METHOD IN EXCHANGE

BACKGROUND OF THE INVENTION

The present invention relates to a package growth/degrowth/shift method in an exchange and, more particularly, to a method of interactively setting operation data in a system at the time of a package growth/degrowth/shift.

ATM (Asynchronous Transfer Mode) technique is agreed in the ITU-T as an exchange system in the next generation, and it is being studied in various institutes as a technique for realizing a broadband ISDN (Integrated Service Digital Network).

FIG. 18 shows the structure of the speech path in an ATM exchange system. In FIG. 18, the reference numerals $11_{11}$ to $11_{1n}$, $11_{21}$ to $11_{2n}$, $11_{31}$ to $11_{3n}$, $11_{41}$ to $11_{4n}$ represent line interface portions (line IF portions) connected to the corresponding lines (transmission lines). Each of the line IF portions $11_{11}$ to $11_{4n}$ extracts an ATM cell inserted into the payload portion of a frame signal (e.g., DS1–DS3 frame signal, SONET frame signal such as OC3C and OC12C), and outputs it to the multiplexers/demultiplexer after subjecting it to accounting, UPC processing and OAM processing, etc. Each line IF portion also inserts an ATM cell input from the multiplexers/demultiplexer into the payload portion of a frame signal, and transmits the frame signal to the transmission line. The reference numerals $12_1$ to $12_4$ denote the multiplexers/demultiplexers which are connected to the line interface portions, and which multiplex cells and demultiplex the multiplexed cells supplied from a switch, and transmits the cells to predetermined line interface portions. The reference numeral 13 a cell switch for switching the input multiplex cells to predetermined routes, 14 a system control unit (CC) for controlling the line interface portions $11_{11}$ to $11_{4n}$, the multiplexers/demultiplexers $12_1$ to $12_4$ and the cell switch 13. The system control unit 14 is provided with a processor (central processor unit CPU) 14a and a main storage (MM). The reference numeral 15 represents a maintenance terminal, and 16 a bus.

The cell switch 13 is connected to a plurality of multiplexers/demultiplexers $12_1$ to $12_4$, switches a cell input from a multiplexer/demultiplexer on the basis of the routing information (tag information) attached to the cell, and outputs the cell to a predetermined multiplexer/demultiplexer. The multiplexers/demultiplexers $12_1$ to $12_4$ are connected to a plurality of line interface portions $11_{11}$ to $11_{1n}$, $11_{21}$ to $11_{2n}$, $11_{31}$ to $11_{3n}$, $11_{41}$ to $11_{4n}$, multiplex the upward cells input from the corresponding line interface portions and output the cells to the cell switch 13. The multiplexers/demultiplexers $12_1$ to $12_4$ also demultiplex the downward cells input from the cell switch 13 and output the cells to the corresponding line IF portions.

The processor (CPU) 14a of the system controller 14 is capable of transmitting and receiving data to and from each of the multiplexers/demultiplexers $12_1$ to $12_4$ and the cell switch 13.

FIG. 19 is an explanatory view of the communication paths between processors in the ATM exchange system. In FIG. 19, the reference numerals $11_{11}$ to $11_{1n}$, ... $11_{N1}$ to $11_{Nn}$ represent line interface portions (individual sections), $12_1$ to $12_N$ multiplexers/demultiplexers (common sections MIF-COM: Middle Interface Common), which are duplexed and provided with #0-equipments and #1-equipments $12_{10}$, $12_{11}$ to $12_{N0}$ and $12_{N1}$. The reference numeral 13 denotes a cell switch (CRSW: Cell Routing Switch), which is duplexed and provided with a #0-equipment $13_0$ and a #1-equipment $13_1$. The reference numeral 14 represents a system control unit, which is duplexed and provided with a #0-equipment $14_0$ and a #1-equipment $14_1$.

The #0- and #1-system control units $14_0$, $14_1$ have the same structure. The reference numeral 14a represents a processor (CPU), 14b a main storage (MM), 14c a bus interface portion (BXC) for communicating between the processors of the #0-equipment $14_0$ and the #1-equipment $14_1$, $14_d$ a PAC (Processor Access Controller) for controlling the communication between the active (ACT)/standby (SBY) speech path device and the processor, 14f a selector (SEL) for selectively extracting a signal from the active speech path device and transmitting the signal to both the active and standby devices, 14g an SCSI controller (SCC) provided with an SCSI interface for controlling an optical disc drive (not shown), and 14h an Ethernet controller (ETC) which is connected to the maintenance terminal 15 (FIG. 18) as an interface.

The #0- and #1-cell switches $13_0$, $13_1$ have the same structure. The reference numeral 13a represents a switch, 13b a PAC-SP (PAC-Speech Path) for controlling the connection of a path between PACs, and 13c a selector. The #0- and #1-common sections $12_{10}$, $12_{11}$ to $12_{N0}$, and $12_{N1}$ have the same structure. The reference numeral 12a represents a PAC device, and 12b a DMA controller (DMAC) for controlling the DMA communication between an individual section and a common section. The maximum number of the common sections $12_1$ to $12_N$ which can be connected to the cell switches $13_0$, $13_1$ is 64, and the maximum number of the individual sections which can be connected to each common sections is 16. Accordingly, in the largest structure of the exchange system, the number of common sections is 64 and the number of individual sections is 1024 (64×16).

FIG. 20 shows a simplified structure of the exchange system shown in FIG. 19. The same reference numerals are provided for the elements which are the same as those shown in FIG. 19. In FIG. 20, the reference numeral 15 represents a maintenance terminal and 17 a magneto-optical disk drive (MOU).

FIGS. 21A and 21B are explanatory views of the apparatus structure of an exchange system. An exchange is provided with a plurality of frames FR as physical equipments, each frame FR including plural layers of shelves SH, each shelf including a plurality of units UN, each unit including a plurality of cards CD, i.e., packages PWCB (Package wiring Circuit Board). There are various kinds of packages PWCB, for example, there are packages for DS1, packages for OC3C, packages for MIFSH (Middle Speed Interface Shelf), packages for HIFSH (High Speed Interface Shelf), and packages for CRSW (Cell Routing Switch).

Each equipment (frame, shelf, unit, card) is provided with an identification number (frame number f, shelf number s, unit number u, card number c) in correspondence with the position. It is therefore possible to specify the equipment which is arranged in an arbitrary position by combining these identification numbers. For example, it is possible to specify a card (package) by an identification number group f-s-u-c, and a shelf by an identification number group f-s. This number group is called an office equipment number (OE number). In an actual exchange shown in FIG. 21B, the equipment number (OE number) is represented by 10 decimal figures such as ffffffsuuc, wherein the first to sixth figures denote frame numbers ffffff, the seventh figure a shelf number s, the eight and ninth figures unit a unit number uu, and the tenth figure a card number c. Therefore, the OE number of the black package in FIG. 21A is represented by [0101012012], and the position of the package installed in the apparatus is specified by this OE number.

In this exchange system, there are cases where the function is raised by increasing the number of lines and a new function is added by increasing, the number of packages (package growth), replacing an old package by a new one, or shifting the position of a package (package shift). Sometimes, an unnecessary package is removed (package degrowth). In such a case, it is necessary to execute various processes such as installation of a new package/removal of an old package, input/delete of office data, set/delete of line data, and test/diagnosis so as to make the exchange system operable. For this reason, conventionally, the person in charge of the exchange plans data in advance in accordance with the conditions of the exchange, converts the planned data into the form of a command at the off line, and inputs the generated command in accordance with the manual.

For example, in the case of newly installing an OC3C package in the MIFSH (MIF shelf), the following commands are generated in advance:

- command for confirming that the MIFSH and the high-ranking equipment are in service,
- command for confirming that no alarm is generated,
- command for inputting the office data (OE number of the package, the package name (OC3C), PWCB type, serial number, etc.),
- command for executing package growth,
- command for confirming data of equipment directed growth (OE number of the package, the package name, equipment status, PWCB type, serial number, information of a high-ranking equipment such as MIFSH number),
- command for setting line data,
- command for executing diagnosis after the package growth,
- command for displaying a self inventory, etc. After the package is installed, these commands are sequentially input to the system in accordance with the manual.

This method is, however, inefficient, because it is necessary to generate commands in advance, which takes much task. In addition, when the commands are input in accordance with the manual, a human-initiated error is likely to occur. A trouble after inputting the commands is difficult to deal with, which may even lead to the necessity of stopping the service of the exchange. For example, if a package is inserted into a wrong position of the exchange, the OE number designated by the command do not agree with the OE number corresponding to the position to which the package has been inserted. In such a case, since the commands do not flow smoothly, it is necessary to inspect the wrong position by stopping the service of the exchange.

In an exchange, the traffic of a certain shelf sometimes considerably increases as compared with the traffics of the other shelves. In such a case, a cell loss occurs and the service is lowered, which greatly influences the operation of the exchange. In a conventional exchange, when the operator inputs commands, an increase in the traffic is confirmed in an NMS (Network Management System) or the like, and the problem is thereafter dealt with. As a result, it is impossible to deal with an increase in the traffic immediately, so that a cell loss cannot be prevented.

SUMMARY OF THE INVENTION

Accordingly, it is an object of the present invention to solve the above-described problems in the related art to provide a package growth/degrowth/shift method which adopts a menu system so as to enable a package growth/degrowth/shift process to be interactively executed by an operator with a good efficiency free from an error and without stopping the service of an exchange.

It is another object of the present invention to prevent a cell loss by shifting a package having a large traffic in a predetermined shelf in which an increase in the traffic is detected, to another shelf so as to disperse the traffic.

To solve the problem in package growth, in one aspect of the present invention, there is provided a package growth method comprising the steps of: (1) registering accommodation conditions data under which the exchange accommodates a package; (2) recording growth scenario data for specifying a package type and the process for necessary for package growth, in each package; (3) judging whether or not a package satisfies the accommodation conditions by identifying the position at which the package is installed and the package type when the package is newly installed in the exchange; (4) creating and registering a detailed growth procedure scenario on the basis of the package growth scenario data recorded in the package, if the package satisfies the accommodation conditions; and (5) interactively executing a growth process in accordance with the detailed growth procedure scenario. In this manner, when a package is installed at a wrong position, it is possible to automatically detect the error and to stop the growth process. In addition, at the time of package growth, it is possible to interactively execute a growth process without the need for generating a command in advance.

When the package does not satisfy the accommodation conditions due to a wrong position of the installed package or the like, the problem is easily dealt with by outputting an error message.

As a line data setting method, a method of setting line data in the form of a menu, a method of setting line data by using a default value and a method of setting line data by using the precedingly input data are prepared. One of these methods is interactively selected, and the line data is set in accordance with the selected method. In this manner, it is possible to set line data with easiness free from an error.

To solve the problem in package degrowth, in another aspect of the present invention, there is provided a package degrowth method comprising the steps of: (1) registering a package growth procedure in correspondence with package identification data; (2) inputting a block command for blocking a package to be removed; (3) reading the growth procedure of the package designated by the block command; (4) eliminating the data set by the growth procedure by interactively executing the growth procedure in the reverse order; and (5) instructing the removal of the package after eliminating the data. In this manner, it is possible to interactively execute the degrowth process without the need for generating a command for package degrowth in advance.

To solve the problem in package shift, in still another aspect of the present invention, there is provided a package shift method comprising the steps of: (1) registering a package growth procedure in correspondence with package identification data; (2) inputting a block command for blocking a package to be shifted; (3) reading the growth procedure of the package designated by the block command; (4) eliminating the data set by the growth procedure by interactively executing the growth procedure in the reverse order;

(5) instructing the removal of the package and the installation of the package to a designated position after eliminating the data; and (6) interactively executing the package growth process in accordance with the growth procedure after shifting the package. In this manner, it is possible to interactively execute the shift process without the need for generating a command for package shift in advance.

To solve the problem of uneven traffic, in a further aspect of the present invention, there is provided a package growth/shift method comprising the steps of: (1) collecting the traffic state of each package; (2) judging whether or not there is uneven traffic is on the basis of the collected traffic state of each package; (3) specifying the package to be shifted and instructing the shift of the specified package, or instructing the growth of a new package, when there is uneven traffic; and (4) interactively executing a package shift process or a package growth process. In this manner, it is possible to disperse the traffic in each shelf, thereby preventing a cell loss.

Other features and advantages of the present invention will be apparent from the following description taken in conjunction with the accompanying drawings.

BRIEF DESCRIPTION OF THE DRAWINGS

FIG. 1 shows the structure of a system controller for executing a package growth process, a package degrowth process and a package shift process;

FIG. 4 shows an example of the layout of a MIFSH shelf;

FIG. 9 is an explanatory view of line data;

DESCRIPTION OF THE PREFERRED EMBODIMENTS (A) System Structure (a) Entire Structure FIG. 1 shows the structure of a system controller and related portions for executing a package growth/degrowth/shift process. In FIG. 1, the reference numeral 1 represents a system controller (which corresponds to the system controller CC shown in FIG. 18), which is provided with an accommodation monitor 101, a traffic information processor 102, a picture controller 103, and a package growth/degrowth processor 104. The reference numeral 2 denotes a maintenance terminal, 3 the rest portion of the exchange with the system controller 1 and the maintenance terminal 2 removed therefrom. The portion 3 includes a hardware portion 3a and a firmware portion 3b. The portion 3 functionally includes line IF portions (individual sections), multiplexers/demultiplexer (common sections) and a switch, and structurally includes frame/shelf/unit/card portions. The reference numerals 4a and 4b denote packages (equipments A, B) for, for example, OC3C. The package 4a is to be newly installed, while the package 4b has already been installed. The reference numeral 5 represents data in the package which has already been written into a storage unit and which includes self inventory data and growth scenario data.

(b) Data in the Package

Figures 2A, 2B:
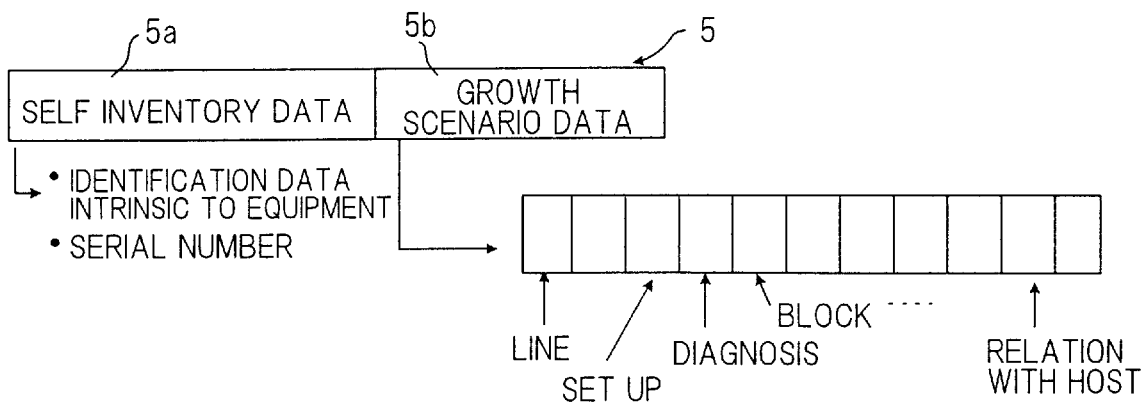
FIGS. 2A and 2B show an example of data in a package.

The data 5 in package includes, as shown in FIG. 2A self inventory data 5a and growth scenario data 5b. The self inventory data 5a is a portion which contains an identification data and a serial number intrinsic to package (equipment) for identifying the package. The self inventory data 5a is composed of:

package type (e.g., OC3C, OC12C, DS1),

PWCB name, data of manufacture, package number (serial number), design figure number, and a package version, as shown in detail in FIG. 2B. The growth scenario data 5b is a portion for designating the process to be executed by the system at the time of package growth. The growth scenario data 5b is composed of a plurality of bits, each of which corresponds to a predetermined process such as the set up of the equipment, the set up of line data, the diagnosis, the block process and so on. The system controller 1 executes the process which corresponds to the bit at which "1" is set at the time of package growth.

(c) Circuit Structure of a Package

Figure 3:
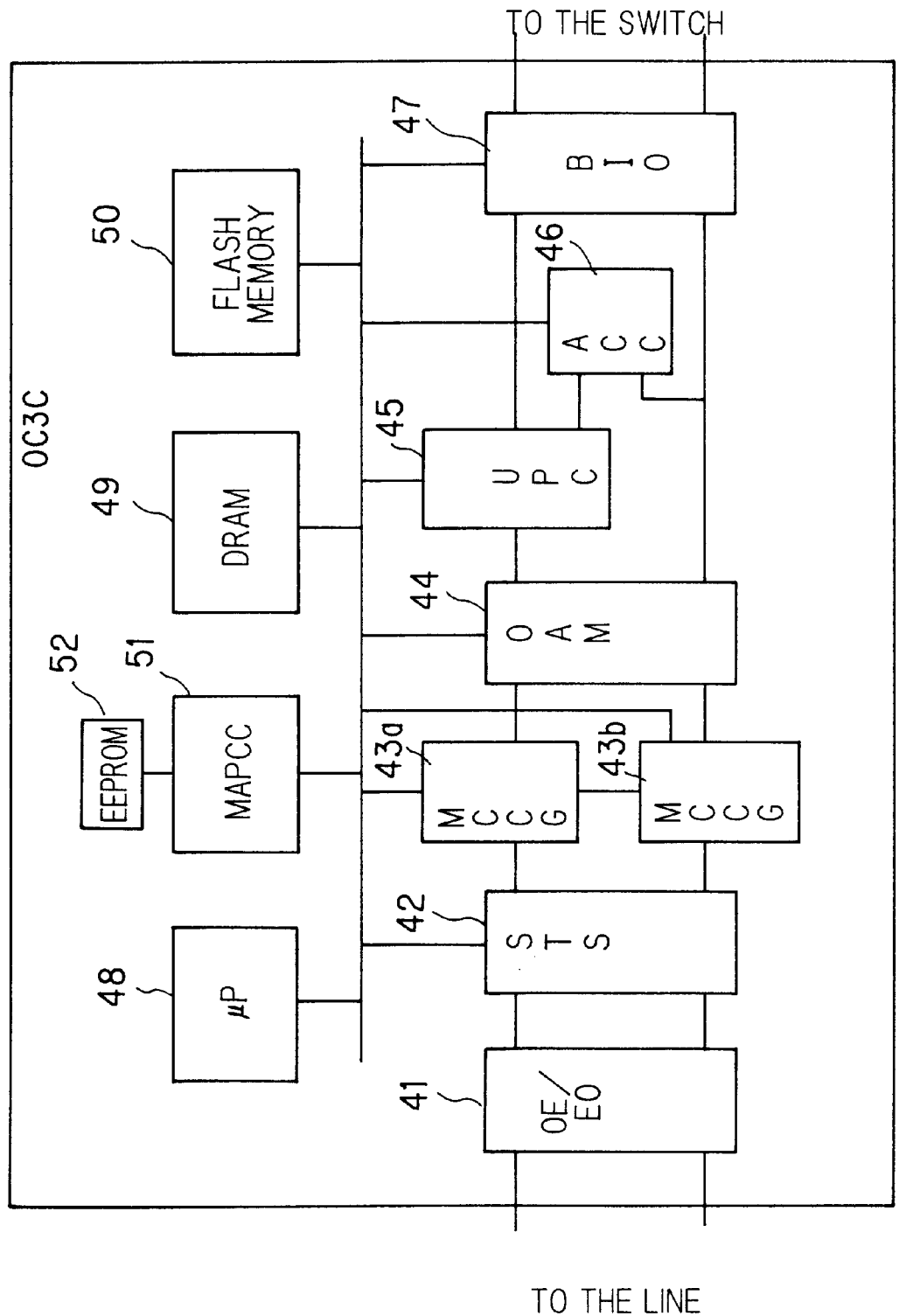
FIG. 3 is a block circuit diagram of an OC3C.

FIG. 3 is a circuitry block diagram of a package, e.g., an OC3C package. In FIG. 3, the reference numeral 41 represents an optical interface portion which is connected to a transmission line composed of optical fibers, and which is provided with an opto-electric converter and an electro-otical converter. The reference numeral 42 represents a SONET end/ATM cell converter, which converts the ATM cell extracted from the payload portion of the SONET frame into a cell format within the switch. The SONET end/ATM cell converter 42 also converts the cell format input from the switch into an ATM cell format, inserts it into the payload portion of the SONET frame, and transmits it to the transmission line. The reference numerals 43a, 43b denote ATM layer performance monitors (MCCG) for controlling the degree of the performance degradation of the subscriber line, 44 an OAM cell processor for inserting and extracting the OAM (Operation, Administration and Maintenance) cells for operation and maintenance. The reference numeral 45 represents a cell flow controller UPC (Usage Parameter Control), which is provided with a function of preventing an extraordinary amount of cell (violator cell) beyond a predetermined band from entering the exchange due to a line trouble or the like.

An accounting portion 46 which executes an accounting operation for cells is provided with a function of measuring the flow rate of cells. The flow rate is measured for every cell having a different VPI value or VPI/VCI value. The accounting portion 46 also counts the total number of cells which have passed. The reference numeral 47 denotes an interface portion connected to the switch, 48 a microprocessor for controlling the entire OC3C circuit, 49 a memory (DRAM) for working the microprocessor 48 and storing data, 50 a flash memory for storing a boot program, 51 a processor peripheral equipment controller, and 52 an EEPRO for storing the self inventory data 5*a* and the growth scenario data 5*b* shown in FIG. 2.

The microprocessor 48 executes (1) test cell looping control, (2) traffic data (such as accounting information) collection and transmission control (traffic control), (3) alarm monitoring control by an OAM cell, (4) data transmit/receive control between system controllers, and the like.

(d) Apparatus Structure of an Exchange

Figure 4:
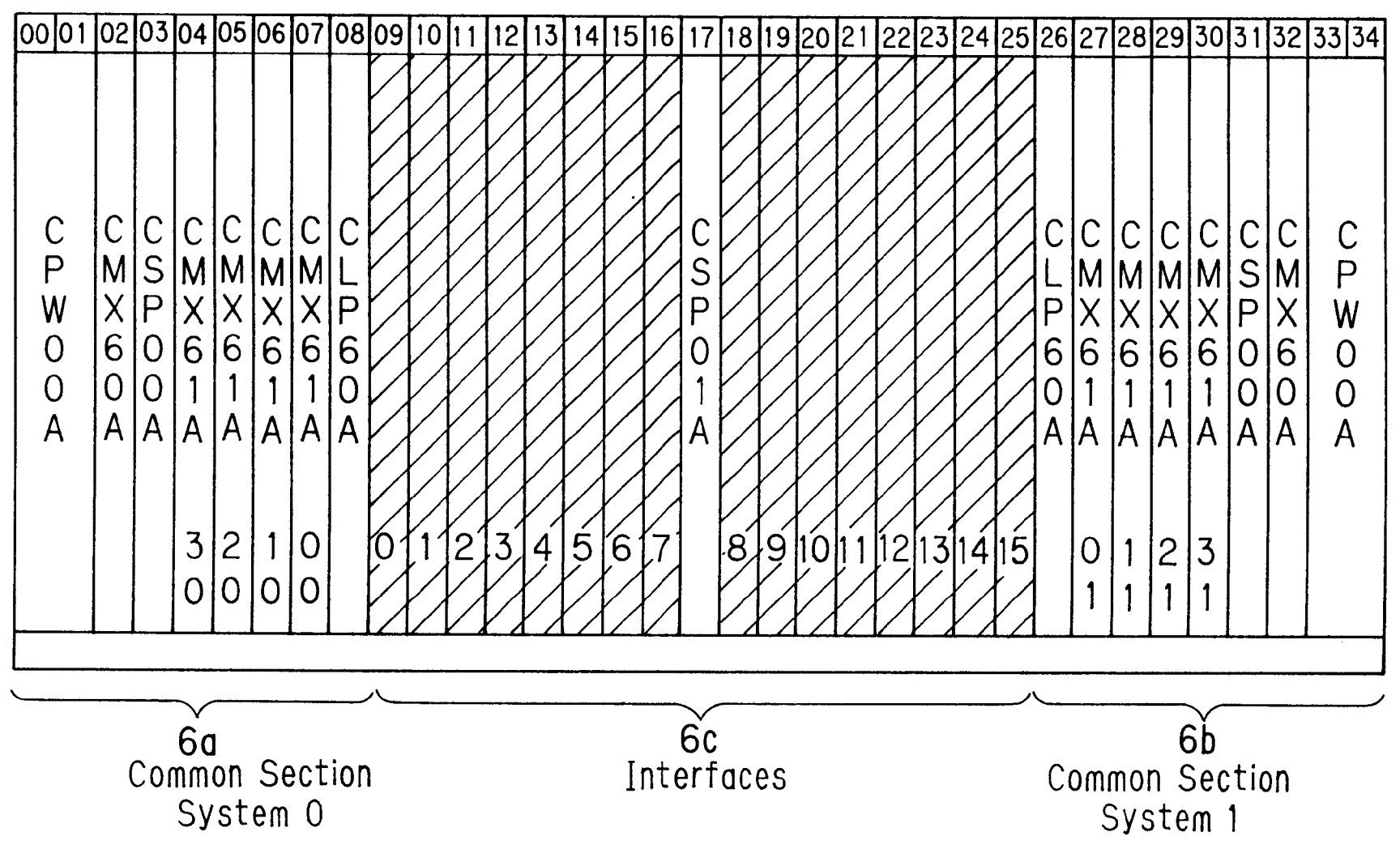
Figure 21B:
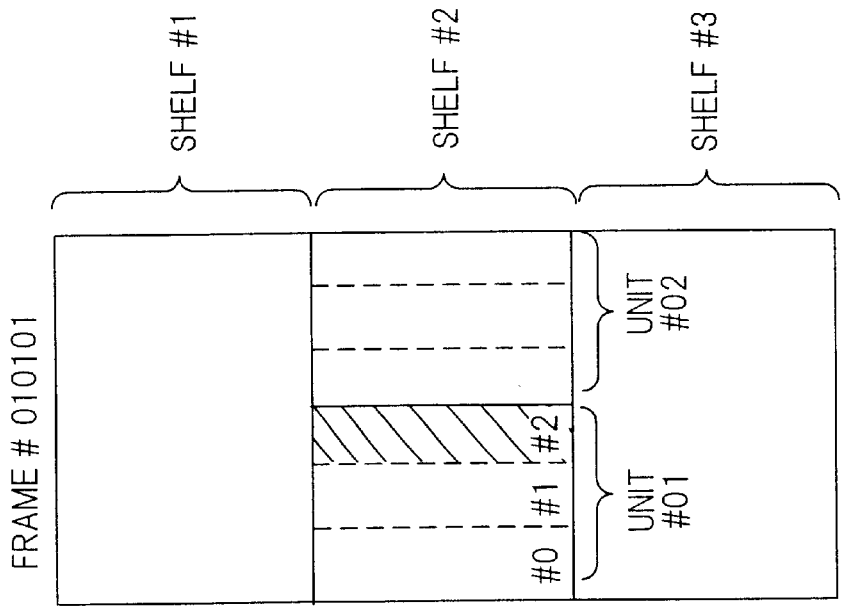
FIGS. 21A and 21B are explanatory views of the apparatus structure of an exchange system and the equipment number (OE number).
Figure 21A:
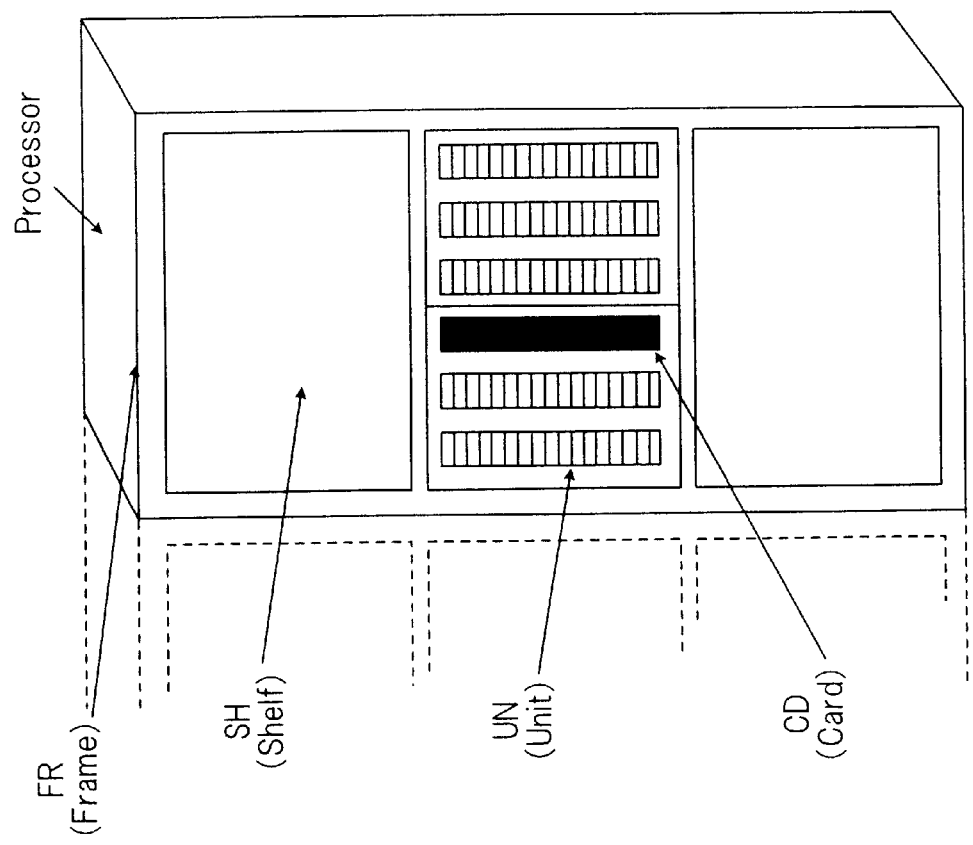

The apparatus structure of an exchange is shown in FIG. 21A and FIG. 21B. As the shelf SH, there are a MIFSH shelf (middle speed interface shelf) into which a package such as OC3C and DS1–DS3 are inserted, and a HIFSH shelf (high speed interface shelf) into which a package such as OC12C is inserted. FIG. 4 is an explanatory view of the layout of a MIFSH shelf. In FIG. 4, the reference numeral 6*a* denotes a portion into which packages constituting a #0-common section are inserted, 6*b* a portion into which packages constituting a #1-common section are inserted, and 6*c* a portion into which 16 packages for line IF portions are inserted.

(e) System Controller (e-1) Accommodation Monitor

In the system controller 1, the accommodation monitor 101 includes a hardware change detector/state change detector 101*a,* an accommodation data storage 101*b* and an accommodation conditions checking portion 101*c*. The hardware change detector/state change detector 101*a* detects an insertion/removal of a package (change in the hardware), and an instruction for the growth or block (change in the state) of an installed package.

Figure 5:
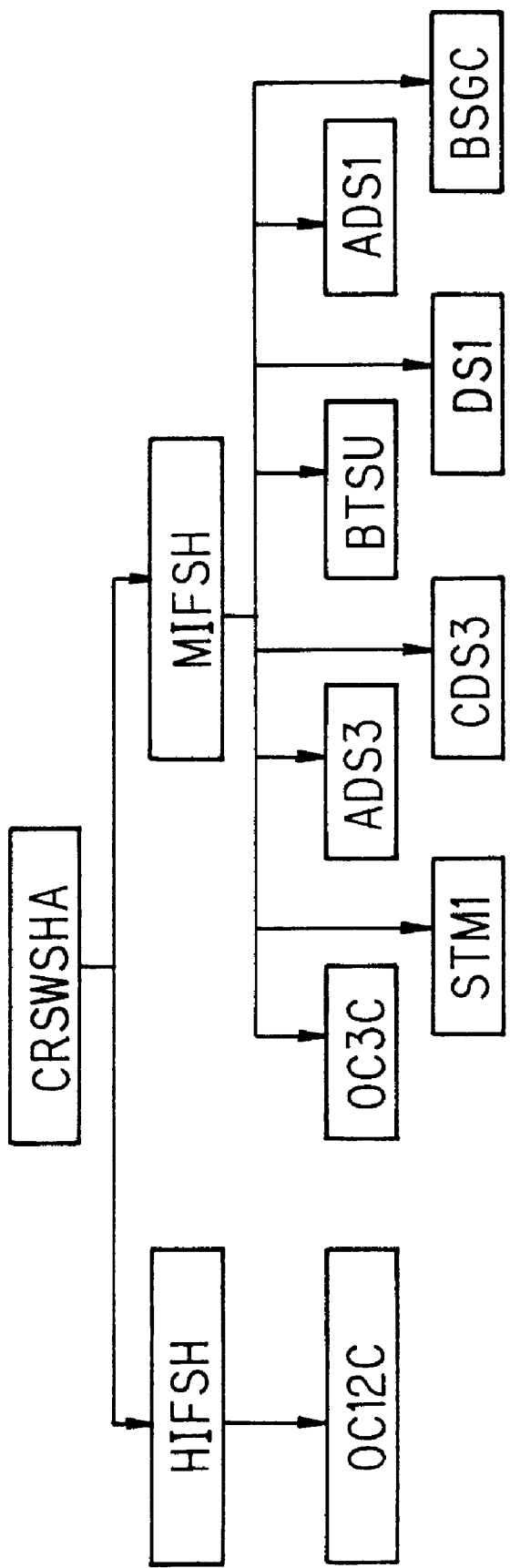
FIG. 5 shows the structure of the apparatus.

The accommodation data storage 101*b* stores the positional condition of package accommodation and the least necessary conditions of hardware structure. For example, if it is assumed that the apparatus is composed of a high-ranking shelf such as a CRSWSHA shelf (Cell Routing Switch Shelf) and low-ranking shelves such as a HIESH shelf and a MJFSH shelf, that an OC12C package for high-speed communication has to be inserted into the HIFSH shelf and that an OC3C package for middle-speed communication, an STM1 package, a package for DS1, BSGC (Broadband Signalling Controller) packages, etc. have to be inserted into the MIFSH shelf, as shown in FIG. 5, the data for specifying the correspondence between a shelf and type of a package installed in the shelf is registered as the accommodation conditions in the accommodation data storage 101*b*. That is, the accommodation conditions include a relationship between the package type and the correct position at which the package is installed.

The accommodation conditions checking portion 101*c* refers to the position of the installed package 4*a*, the package type contained in the self inventory data 5*a* and accommodation conditions data, and if the position of the installed package 4*a* satisfies the accommodation conditions, the accommodation conditions checking portion 101*c* hands the processing to the later-described package growth/degrowth processor 104. On the other hand, if the position of the installed package 4*a* does not satisfy the accommodation conditions, the accommodation conditions checking portion 101*c* outputs an error message to the maintenance terminal 2. For example, it is assumed that an OC3C package is mounted on the HIFSH shelf by mistake. The accommodation conditions checking portion 101*c* recognizes, from the self inventory data 5*a* of the installed package, that the package is an OC3C package and from the accommodation conditions data, that the package must be mounted on the MIFSH shelf. As a result, the accommodation conditions checking portion 101*c* detects that the OC3C package has been mounted on the HIFSH shelf by mistake. and outputs an error message.

(e-2) Traffic Information Processor

The traffic information processor 102 collects/analyzes the traffic information in a shelf and a package of the exchange so as to judge the necessity of package shift or package growth. The traffic information processor 102 includes an information collector 102*a* for collecting the traffic information from each package, a storage portion 102*b* for storing the collected traffic data, a monitor statistical conditions register 102*c,* a storage portion 102*d* for storing the monitor statistical conditions, information calculator/analyzer 102*e* for totalizing and analyzing the collected traffic information, and a storage portion 102*f* for storing the result of analysis. The register 102*c* extracts the monitor statistical conditions (various threshold values, data statistical unit, trigger condition/period for reporting the result of check, etc.) set or changed by the operator from the terminal 2, and registers the conditions in the storage portion 102*d*. The information collector 102*a* periodically collects the count information on the passed cells which are counted by the accounting portion 46 (see FIG. 3) of each package, and stores the information in the storage portion 102*a* as traffic data. The information calculator/analyzer 102*e* accumulates the cell count information collected under the monitor statistical conditions, classifies the traffic states of the shelves into ranks, and stores the result of analysis (rank data) in the storage portion 102*f*. The information calculator/analyzer 102*e* also detects uneven cell traffic in a shelf on the basis of abnormality judging conditions such as a threshold value, judges whether or not the package shift or package growth is necessary, and transfers the processing to the package growth/degrowth processor 104, if the answer is in the affirmative.

(e-3) Picture Controller

The picture controller 103 is provided with an input/output controller 103*a* for controlling the operation of outputting a message to the maintenance terminal 2 and receiving the data input by the operator from the terminal 2, and an apparatus drawing outputting portion 103*b* for displaying the apparatus drawing for showing the operator the operation of the apparatus at the time of package degrowth or shift.

(e-4) Package Growth/degrowth Processor

The package growth processor 104 automatically executes the growth process/degrowth process/shift process and it has a function of interactively urging the operator to operate the apparatus or to input data. The package growth/degrowth processor 104 includes a growth portion 104*a* for executing a growth process, a degrowth/shift portion 104*b* for executing a degrowth process/shift process, a growth/shift portion 104c for executing a growth process/shift process based on traffic information, an equipment layer data storage 104d, a growth procedure storage 104e, an equipment control data storage 104f, a line data storage 104g, a default data storage 104h, and a temporary data storage file 104i.

(1) Growth Procedure Data

Figure 6:
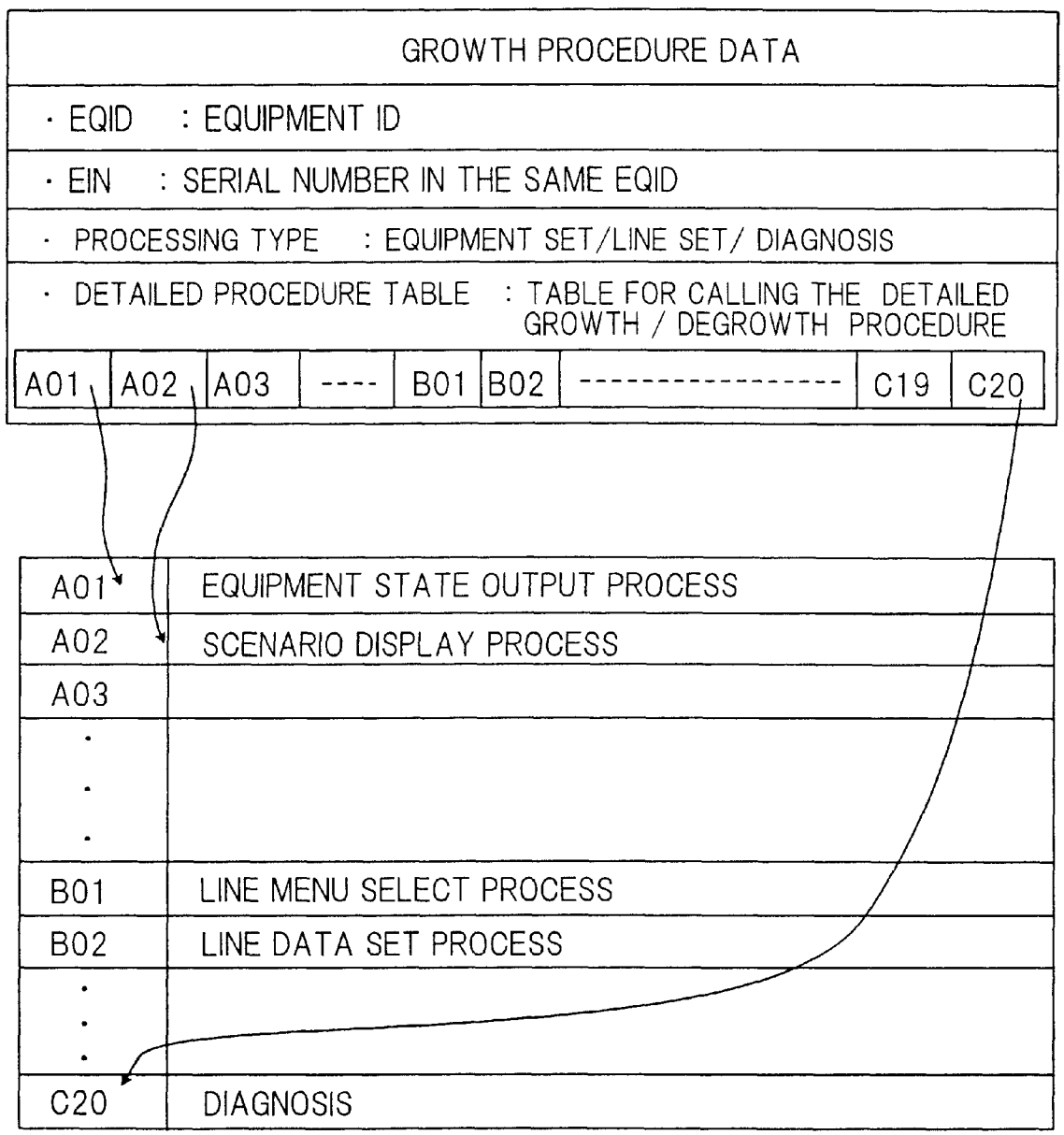
FIG. 6 is an explanatory view of growth procedure data.

The growth procedure data storage 104e stores the growth procedure data for indicating the growth procedure of each package which is installed in the exchange, as shown in FIG. 6. The growth procedure data contains EQID: equipment type ID such as a package name (OC3C, etc), EN: serial number in the equipment type ID, processing type: e.g., process for the set up of the equipment (package), process for the set up of the line data, process for the diagnosis and so on which correspond to the growth scenario data 5b, detailed procedure table: table for calling the detailed growth/degrowth procedure.

Each of the items A01, A02 . . . is used to call a detailed process (equipment state drawing output process, scenario display process, equipment state confirm process, line menu select process, line data set process . . . , diagnosis) to be executed for the purpose of package growth, and the system controller 1 executes the growth process in accordance with the procedure shown in the table.

(2) Equipment Control Data

Figure 7:
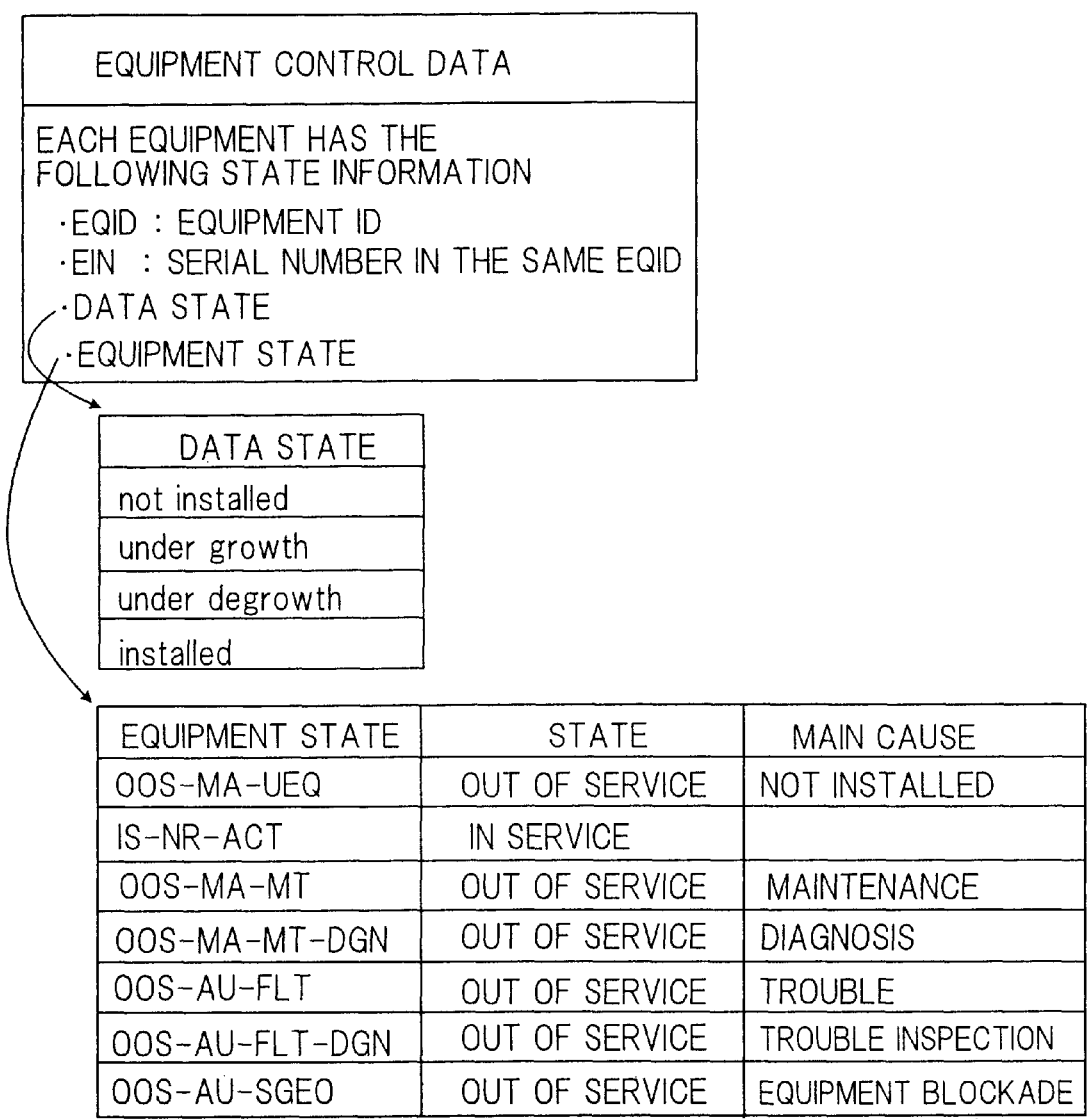
FIG. 7 is an explanatory view of equipment control data.

The equipment control data storage 104f stores the equipment control data of each package which is installed in the exchange, as shown in FIG. 7. The equipment control data contains EQID: equipment type ID EIN: serial number in the equipment type ID, data state, and equipment state.

The data state shows that the equipment (package) is not installed, under growth, under degrowth or installed. The equipment state shows that the equipment is out of service because it is not installed, in service, out of service for maintenance, out of service for diagnostics, out of service due to a trouble, out of service for trouble inspection, or out of service due to blockade.

(3) Layer Data

Figure 8:
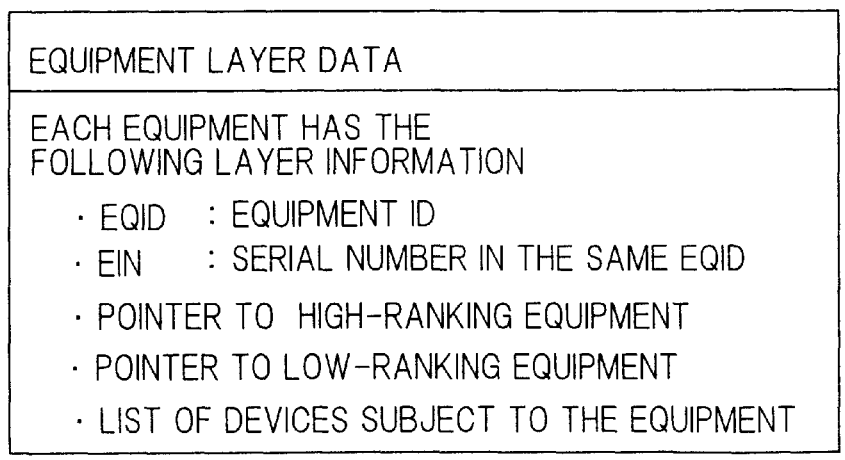
FIG. 8 is an explanatory view of layer data.

The equipment layer data storage 104d stores the data showing the layer relationship of each equipment (package) which is installed in the exchange, as shown in FIG. 8. The layer data contains EQID: equipment type ID EIN: serial number in the equipment type ID, pointer to a high-ranking equipment, pointer to a low-ranking equipment, and a list of devices subject to the equipment (4) Line Data The line data storage 104g stores the line data of each equipment (package) which is installed in the exchange, as shown in FIG. 9. The line data contains the position at which the package for a line IF is installed: ffffffsuuc, signal transmission line length, reception expectant J1 byte value for path trace, transmission expectant J1 byte value for path trace, loop back test permission for the opposite equipment, interface type, alarm profile identification, maximum size and maximum number of cells on the interface, maximum transferable physical band on the interface, accountant identification information, etc.

(5) Growth Portion

The growth portion 104a refers to the growth scenario data 5b (FIG. 2) of the package as the object of growth and the growth procedure data of this package stored in the growth procedure data storage 104e, and if the growth scenario data has not been registered in the growth procedure data storage 104e, the growth portion 104a registers it in the growth procedure data storage 104e. The growth portion 104a creates a detailed growth procedure scenario by using the growth scenario data, the equipment control data, etc. of the package as the object of growth, and registers it in the growth procedure data storage 104e. The detailed growth procedure scenario is created by arranging the process for the set up of the equipment, the process for the set up of the line data and process for the diagnosis in the stated order. Then, in accordance with the process for the setup of the equipment, the equipment control information and the equipment layer information of the newly installed package are added to those of the equipment control data storage 104f and the equipment layer data storage 104d.

The growth portion 104a then executes a line set process in accordance with the detailed procedure table (growth procedure scenario). In order to set line data, a desired setting method is selected from among (1) a method of setting line data in the form of a menu, (2) a method of setting line data by using a default value stored in the default data storage 104h and (3) a method of setting line data by using the precedingly input data stored in the temporary data storage file 104i and sets the line data in the line data storage 104g.

It is possible that the growth portion 104a stores the set data in the temporary data storage file 104i during the execution of the growth process, and restores the state of the equipment to the original state before the growth by executing the line data process in the reverse order by using the set data stored in the temporary data storage file 104i when the process is cancelled in the middle of the procedure.

(6) Degrowth/Shift Portion

In the case of package degrowth, the degrowth/shift portion 104b extracts the growth procedure data (FIG. 6) of the package as the object of degrowth from the growth procedure data storage 104e, and creates a degrowth procedure scenario by the reverse conversion. The degrowth/shift portion 104b then deletes the line data/equipment control data/equipment layer data by the degrowth process in accordance with the degrowth procedure scenario, and instructs the operator to remove the equipment as the object of degrowth by displaying the equipment drawing.

In the case of package shift, the degrowth/shift portion 104b creates line data on the position to which the equipment is shifted, deletes the line data on the original position of the equipment, and instructs the operator to remove the equipment by displaying the equipment drawing. After the removal of the equipment, equipment control data is set in the same way as in the growth procedure, and switches the line data over to the line data of the shifted equipment which has already been created.

It is possible that the degrowth/shift portion 104b stores the deleted data in the temporary data storage file 104i, and restore the state of the equipment to the original state before the degrowth/shift by executing the line data process in the reverse order by using the deleted data stored in the temporary data storage file 104i when the process is cancelled in the middle of the procedure.

(7) Growth/Shift Portion

The growth/shift portion 104c for executing the growth/shift process in accordance with traffic information takes over the processing of the traffic information processor 102, and executes the processing similar to the growth/shift process so as to disperse the traffic.

(B) Package Growth Process

Figure 10:
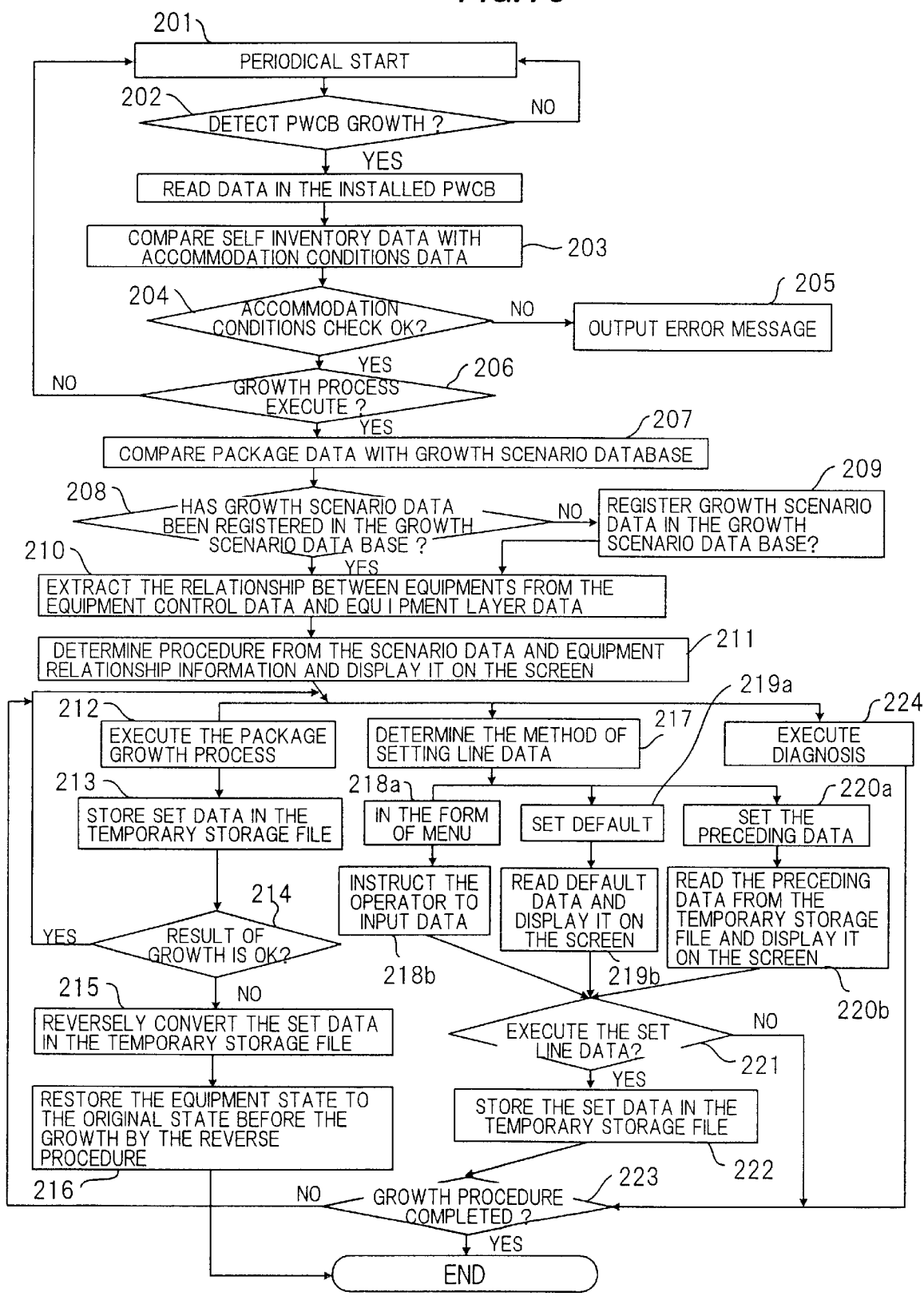
FIG. 10 is a flowchart of a package growth process.

FIG. 10 is a flowchart of a package growth process.

The equipment accommodation monitor 101 periodically monitors the apparatus so as to detect the insertion of a package PWCB or the package growth instruction (steps 201, 202). When the equipment accommodation monitor 101 detects the growth of the package PWCB, reads the data (self inventory data and growth scenario data) stored in the package (step 203), checks the extracted self inventory data and the accommodation conditions data of the system so as to judge whether or not the package as the object of growth has been inserted into the right position (accommodation conditions check, step 204). If the position of the installed package does not satisfy the accommodation conditions, for example, if the package for OC3C is mounted on the HIFSH shelf, it is judged to be an error, and the equipment accommodation monitor 101 urges the operator to reinstall by outputting the message to the terminal 2 (step 205). However, if the OC3C package is correctly mounted on the MIFSH, the equipment accommodation monitor 101 judges that the accommodation conditions are satisfied, and ascertains whether or not the operator executes the growth process (step 206).

If the execution of the growth process is denied, the process returns to the start and the subsequent steps are repeated. On the other hand, if the execution of the growth process is instructed, the growth portion 104a checks the growth scenario data (FIG. 2) of the package as the object of growth and the growth procedure data in the growth procedure data storage 104e (step 207). If it is found that the growth scenario data has not been registered in the growth procedure data storage 104e (step 208), the growth portion 104a registers the growth scenario data in the growth procedure data storage 104e (step 209).

On the other hand, if the growth scenario data of the package for OC3C has been registered in the growth procedure data storage 104e (step 208), the growth portion 104a extracts the relationship between the OC3C, MIFSH, CRSWSHA, etc. from the set equipment control data (FIG. 7) and the set equipment layer data (FIG. 8) (step 210), determines the growth procedure table (OC3C growth procedure scenario) from the equipment relationship information and the growth scenario data, and displays the table on the screen (step 211). Thereafter, the growth portion 104a executes the growth process in accordance with the growth procedure scenario.

That is, the growth portion 104a executes the package growth process in accordance with the growth procedure under the growth command (step 212), and temporarily stores the data set in each storage in the temporary data storage file 104i (step 213). After the end of the package growth process, the growth portion 104a outputs a message for confirming the execution result so as to judge whether or not the result of the growth is NG or OK (step 214). If the result of the growth is NG, the growth portion 104a reversely converts the set data which are stored in the temporary storage file 104i (step 215), and restores the state of the equipment to the original state before the growth (step 216), thereby finishing the growth process.

On the other hand, if the result of the growth is OK, the growth portion 104a sets line data in accordance with the growth procedure scenario. In order to set line data, the growth portion 104a selects one method from among (1) a method of inputting line data in the form of a menu, (2) a method of setting line data by using a default value of the system, and (3) a method of setting line data by using the precedingly set line data which is stored in the temporary data storage file 104i for each equipment (step 217), and sets line data in accordance with the selected method (steps 218a to 220b).

The growth portion 104a then judges whether or not the set line data is adopted (a 221), and if the answer is in the affirmative, the set line data is stored in the temporary data storage file 104i (step 222). Thereafter, judgement is made as to whether or not all the growth procedure is completed by reference to the growth procedure scenario (step 223), and if the answer is YES, the growth process is finished. If the answer is NO and some part of the growth procedure, for example, the diagnostic processing remains unexecuted, the growth portion 104a issues the execution command so as to execute the diagnostic processing, thereby finishing the growth process.

FIGS. 11 to 14 show the images displayed on the screen of the terminal 2 at the time of a package growth.

Figure 11A:
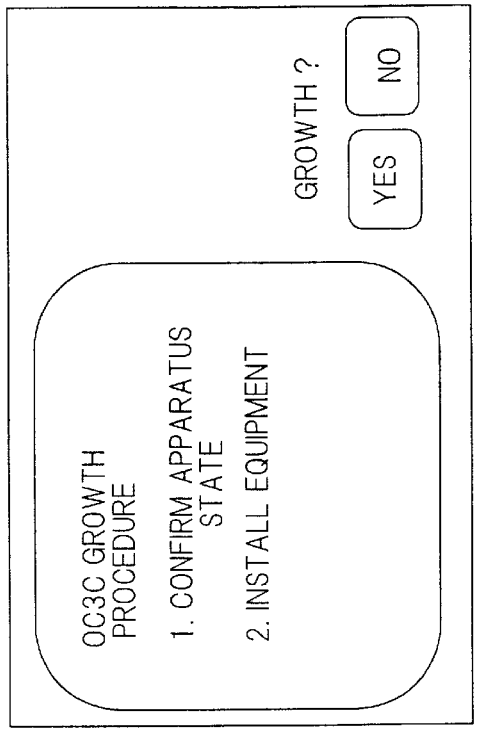
FIGS. 11A to 11D show first group of images in a package growth procedure.

1. When the installation of a new package is detected, a dialogue box is displayed on the screen in operation, as shown in FIG. 11A. In order to execute the growth process, YES is selected.

Figure 11B:
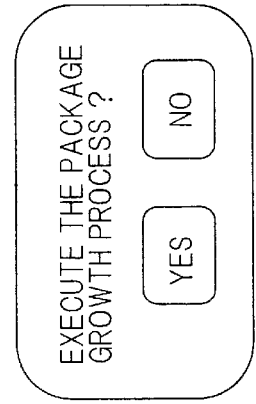

2. When YES is selected, the equipment state drawing is displayed, as shown in FIG. 11B. Since the place at which the new package is installed is shown, whether or not the growth process is to be executed is confirmed by selecting YES or NO.

Figure 11C:
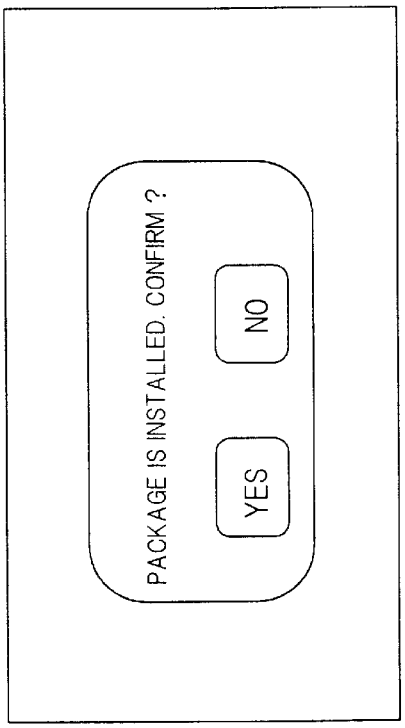

3. When the execution of the growth process is selected, the growth procedure table (growth procedure scenario) of the newly installed OC3C package is selected and displayed, as shown in FIG. 11C. When the growth process is executed, YES is selected.

Figure 11D:
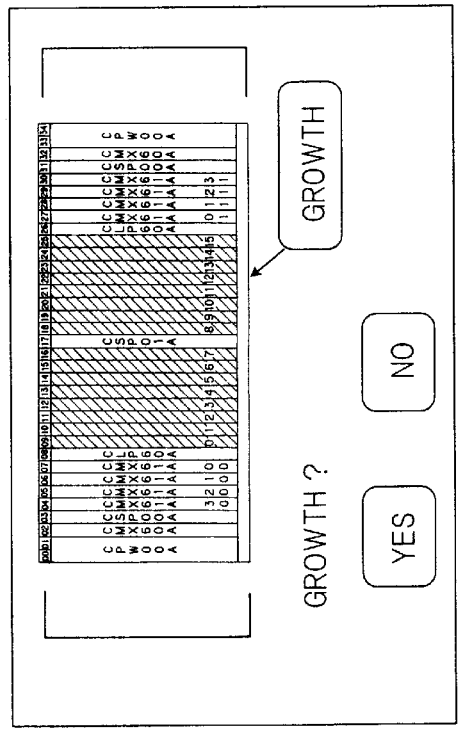

4. When the execution of the growth process is selected, the confirmation box for confirming the execution of the growth process is first displayed (FIG. 11D).

5. When the execution of the growth process is selected, a picture showing that the package growth process is under way is displayed, as shown in FIG. 12A.

6. When the growth process is finished, the picture for selecting a line data setting process mode is displayed, as shown in FIG. 12B. The method of selecting line data is selected from menu/default/preceding data. If the menu is selected the picture shown in FIG, 12C is displayed, if the default is selected, the picture shown in FIG. 13A, and if the preceding data is selected, the picture shown in FIG. 13B is displayed.

Figure 12C:
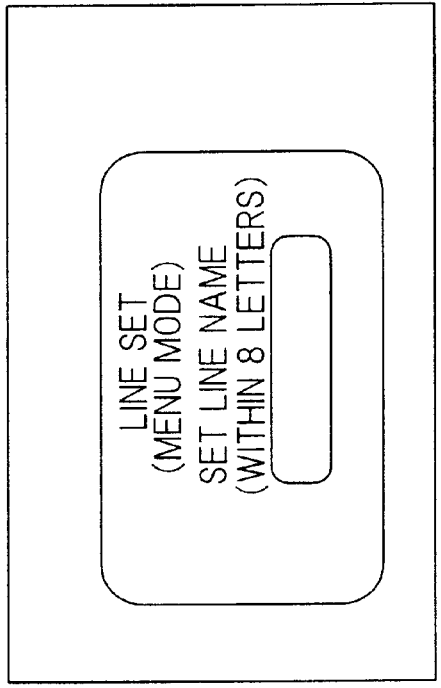
FIGS. 12A to 12D show second group of images in a package growth procedure.
Figure 12D:
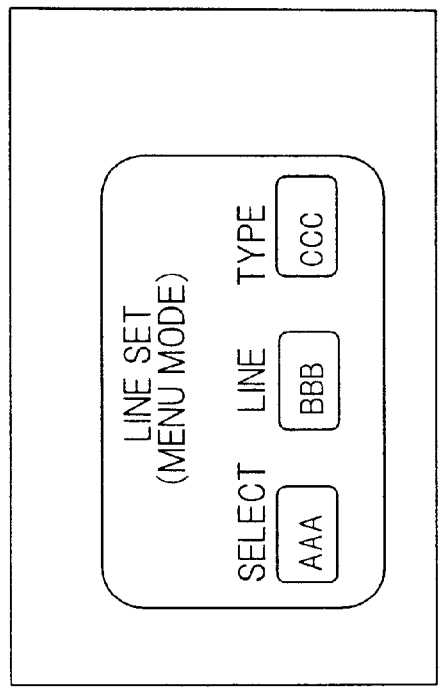
Figure 12A:
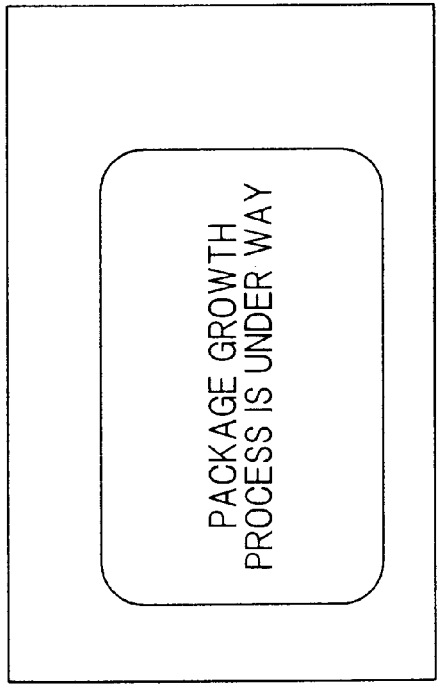
Figure 12B:
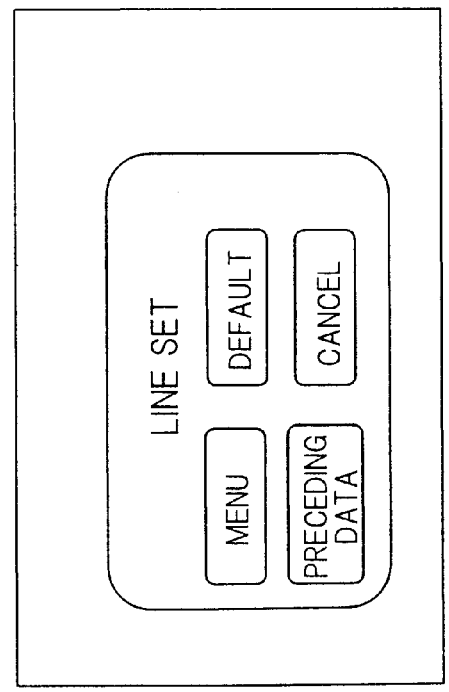

When the menu mode is selected, line data is interactively set, as shown in FIGS. 12C and 12D. FIG. 12C shows an example of the line setting operation using keys for inputting data, and FIG. 12D an example of the line setting operation using a button for selecting data.

Figure 13A:
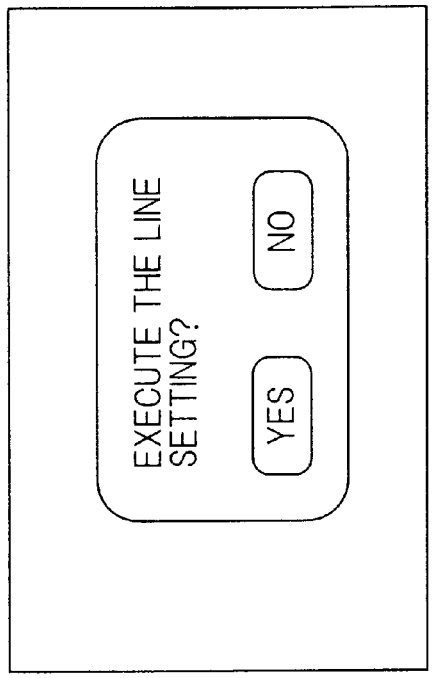
FIGS. 13A to 13D show third group of images in a package growth procedure.

When the default mode is selected, the default value of each data is displayed on the screen, as shown in FIG. 13A, and line data is set.

Figure 13C:
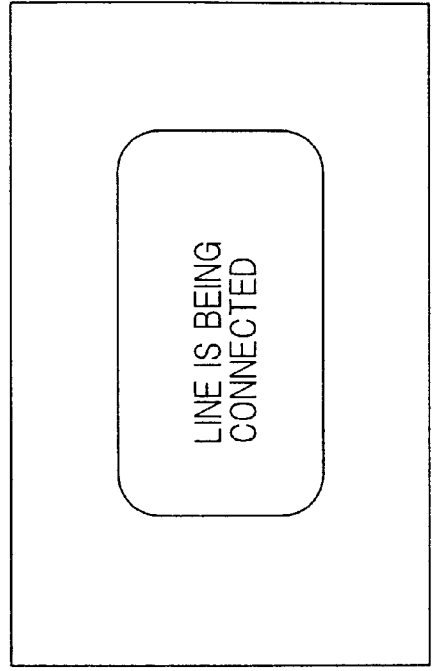
Figure 13B:
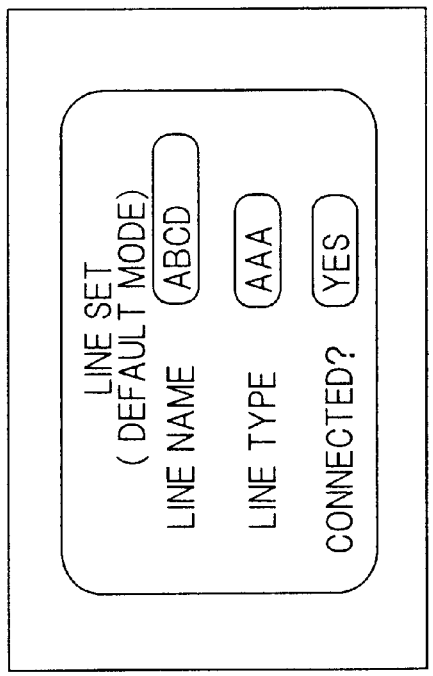

When the preceding data mode is selected, the precedingly set data is displayed, as shown in FIG. 13B, and line data is set.

7. When the line data set process is finished, the picture for confirming the execution of line data setting is displayed, as shown in FIG. 13C.

Figure 13D:
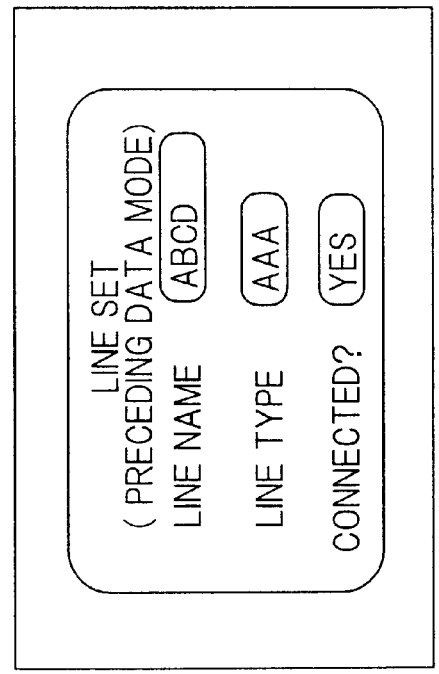

8. If the execution of line data setting is instructed, the picture showing that the line is being connected is displayed, as shown in FIG. 13D.

Figure 14A:
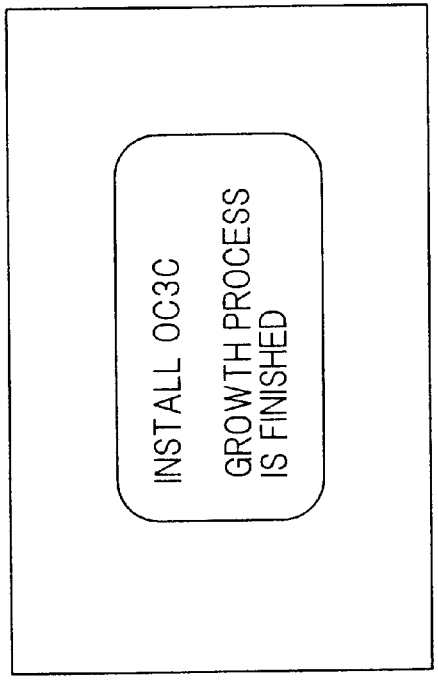
FIGS. 14A to 14C show a fourth group of images in a package growth procedure.
Figure 14C:
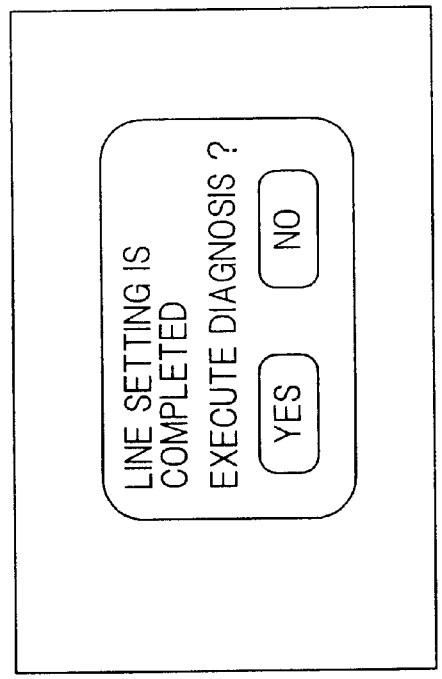
Figure 14B:
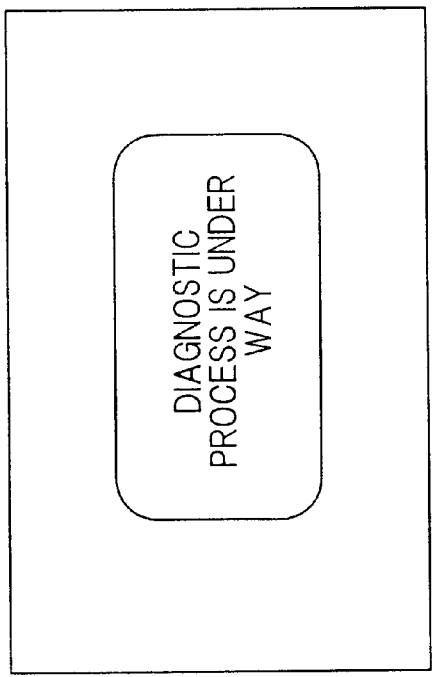

9. When the line setting process is completed, the picture for selecting a diagnostic process is displayed, as shown in FIG. 14A. If the execution of diagnosis is instructed, the picture showing that the diagnostic process is under way is displayed, as shown in FIG. 14B. When the diagnostic process is finished, the picture showing the end of the OC3C package growth process is displayed, as shown in FIG. 14C.

(C) Process for Package Degrowth and Package Shift

Figure 15:
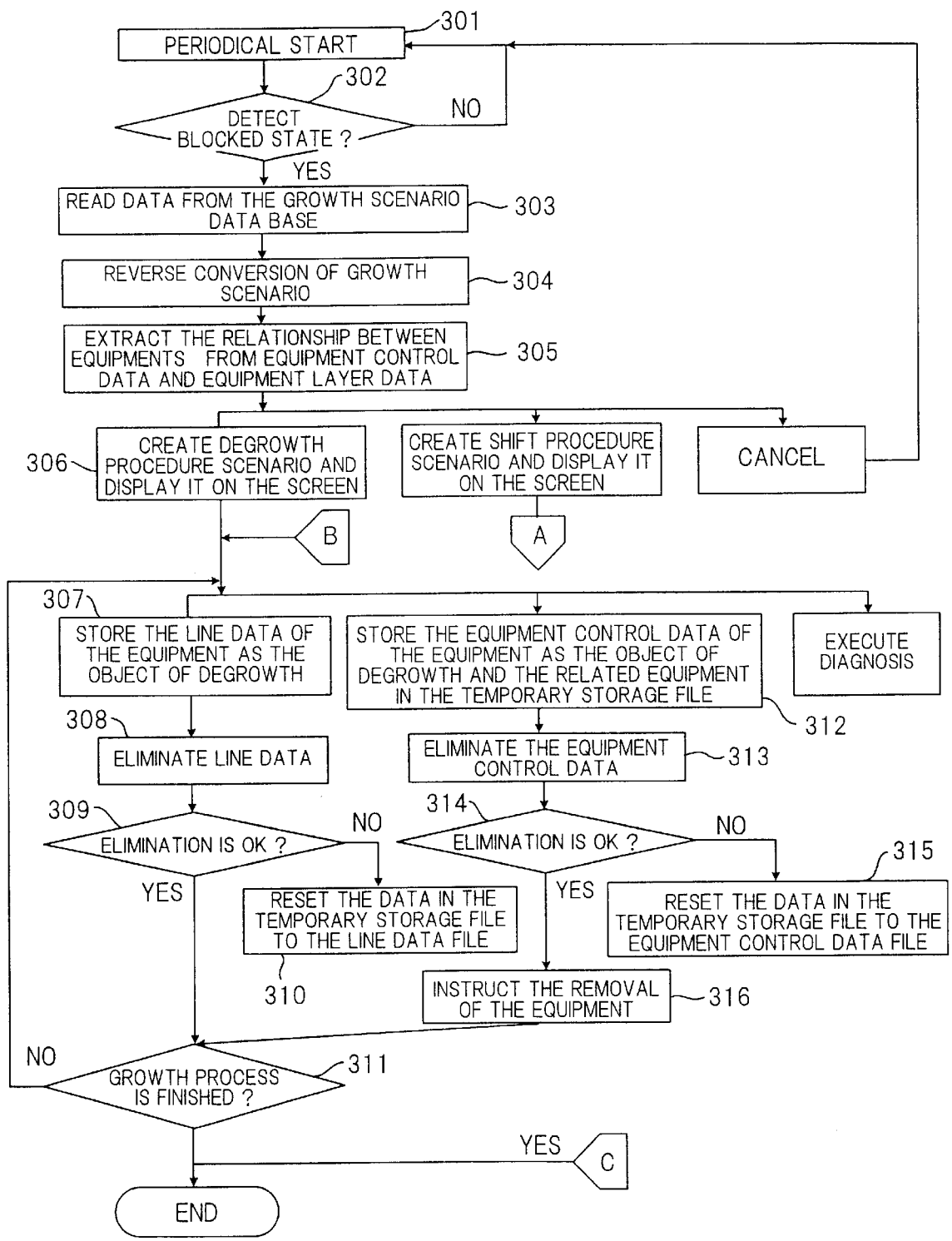
FIG. 15 is first flowchart of a package degrowth/shift process.
Figure 16:
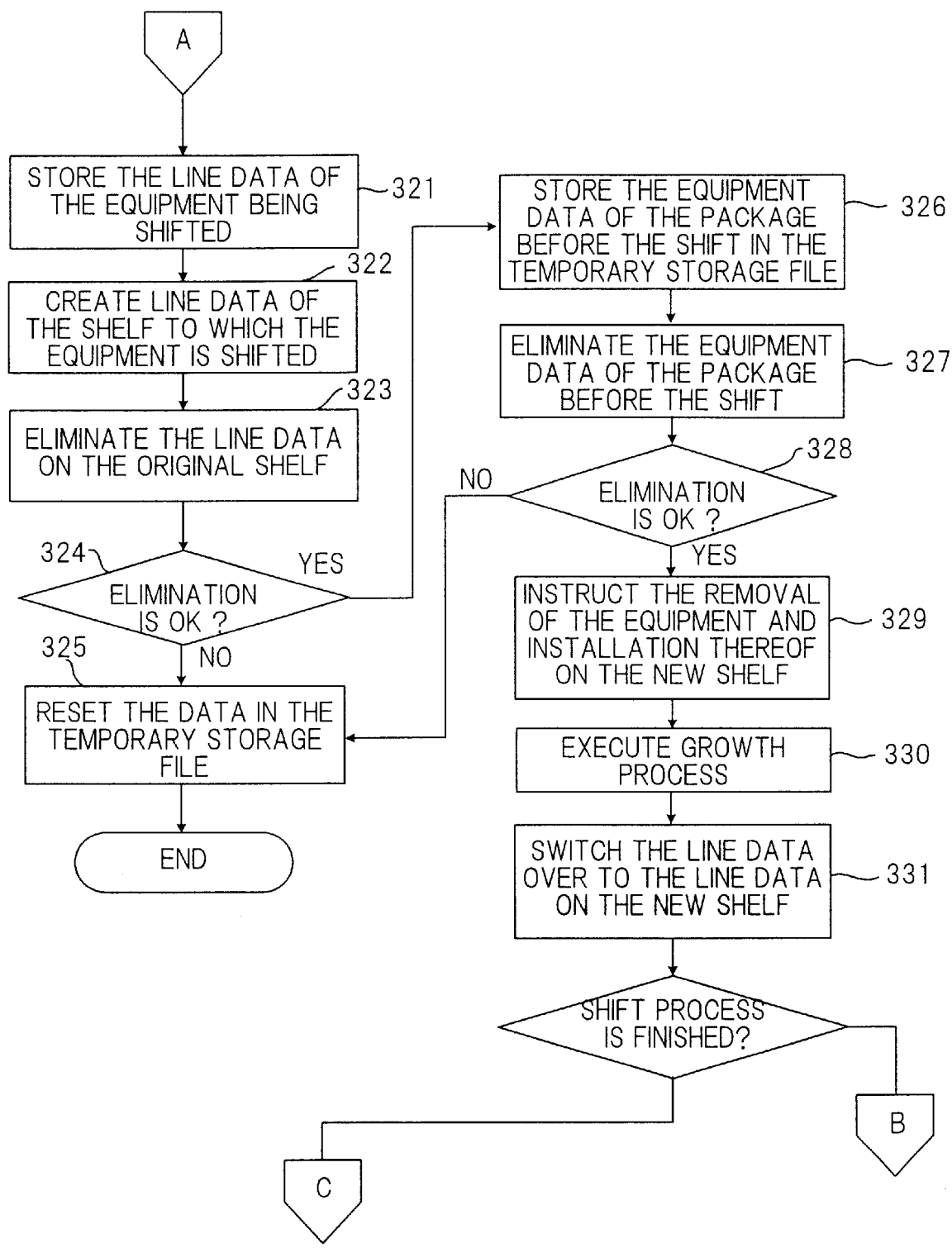
FIG. 16 is second flowchart of a package degrowth/shift process.

FIGS. 15 and 16 are flowcharts of a package degrowth/shift process according to the present invention.

The accommodation monitor 101 periodically monitors the apparatus so that it detects that a predetermined package (e.g., package #B) on a predetermined shelf (e.g., shelf #2) is blocked under a block command (steps 301, 302). The degrowth/shift portion 104b then reads the growth procedure data of the blocked package from the growth procedure data storage 104e and creates a detailed growth procedure scenario (step 303), then, reversely converts the growth procedure scenario (step 304), and thereafter extracts the relationship between the equipment and another equipment from the registered equipment control data (FIG. 7) and equipment layer data (FIG. 8) (step 305). The operator can select whether the degrowth process or the shift process is to be executed.

When the degrowth process is selected, the degrowth/shift portion 106b creates a degrowth procedure scenario by converting reversely the detailed growth procedure scenario so that the degrowth procedure scenario is capable of eliminating the data set by the package growth procedure. Then, the degrowth/shift portion 106b ascertains whether or not the operator executes the degrowth process (step 306). If the process is to be executed, the line data of the package as the object of degrowth is stored in the temporary storage file 104i in accordance with the degrowth procedure scenario, and the line data is thereafter eliminated (steps 307, 308). After the elimination of the line data, whether the elimination is OK or NG is interactively inquired (step 309), and if it is NG, the eliminated data stored in the temporary storage file 104i is reset to the original state before the degrowth (step 310) thereby finishing the process.

If the elimination of the line data is OK, judgment is made as to whether or not the degrowth procedure scenario is finished (step 311), and if the answer is in the negative, after the equipment control data and the equipment layer data of the package as the object of degrowth and the related package are stored in the temporary storage file 104i, the line data is eliminated (steps 312, 313).

Thereafter, whether the elimination of the equipment control data and the equipment layer data is OK or NG is interactively inquired (step 314), and if it is NG, the line data, the equipment control data and the like which are stored in the temporary storage file 104i are reset to the original state before the degrowth (step 315), thereby finishing the process.

On the other hand, if the elimination is OK, the equipment drawing is displayed on the screen so as to instruct the operator to remove the equipment (step 316). When the operator removes the equipment, the degrowth process is finished.

If the shift process is selected is selected after the step 305, the degrowth/shift portion 104b creates a shift procedure scenario by arranging front process, degrowth process, growth process and later process in the stated order. Then, in accordance with the shift procedure scenario, the line data of the package (package #B on the shelf #2) as the object of shift is stored in the temporary storage file 104i, and line data for the shelf (e.g., #1) to which the package is to be shifted is created (step 322). Thereafter, the line data of the package #B is eliminated (step 323).

After the elimination of the line data, whether the elimination is OK or NG is interactively inquired (step 324), and if it is NG, the eliminated data stored in the temporary storage file 104i is reset to the original state before the shift (step 325), thereby finishing the process.

If the elimination of the line data is OK, after the equipment data of the package B on the shelf #2 is stored in the temporary storage file 104i, the equipment data of the package #B is eliminated (steps 326, 327).

Thereafter, whether the elimination of the equipment data is OK or NG is interactively inquired (step 328), and if it is NG, the line data and the equipment data which are stored in the temporary storage file 104i are reset to the original state before the shift (step 325), thereby finishing the process.

On the other hand, if the elimination is OK, the degrowth/shift portion 104b instructs the operator to remove the package #B on the shelf #2 and install it on the shelf #1 (step 329). Under the instruction, the operator removes the package #B and installs it at a predetermined position of the shelf #1. After the installation of the package #B, the growth process is executed (step 330), and the line data is switched over to the line data for the shelf #1 which has been set at the step 322. Judgement is made as to whether or not the shift procedure is finished (step 332), and if the answer is YES, the shift process is finished.

(D) Package Growth/Shift Process Based on Traffic Information

Figure 17:
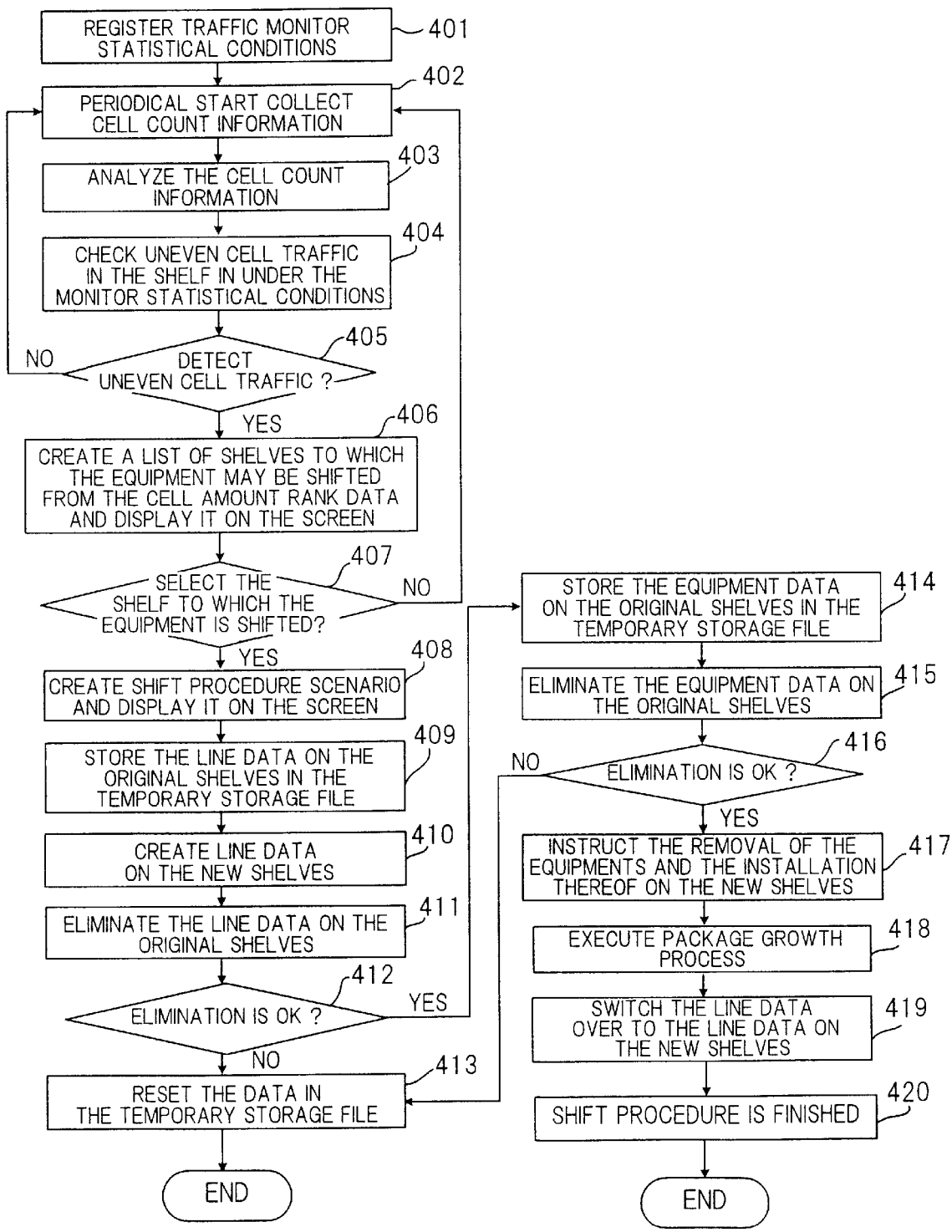
FIG. 17 is a flowchart of a package growth/shift process based on traffic information.
Figure 18:
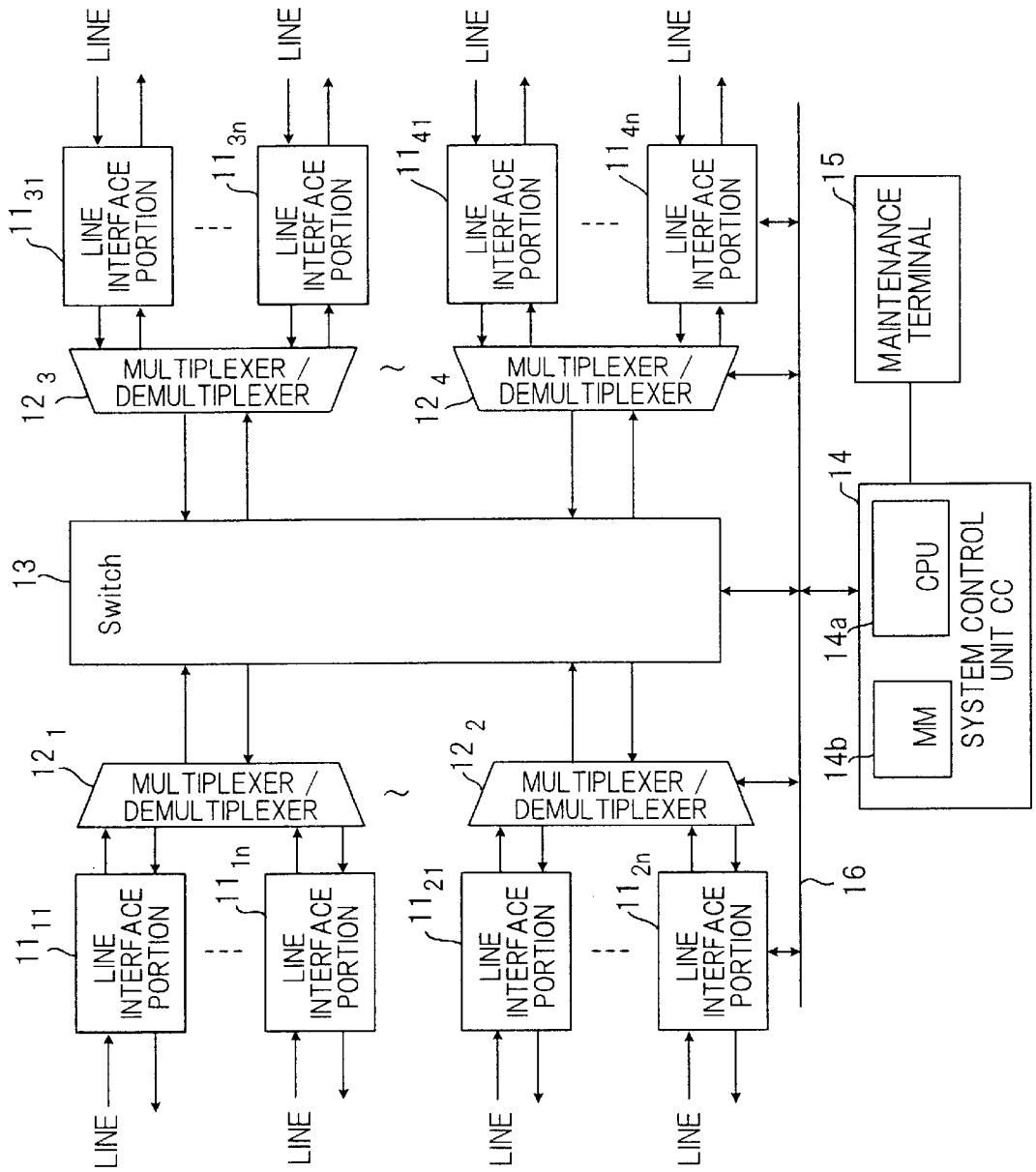
FIG. 18 shows the structure of an ATM exchange system.
Figure 19:
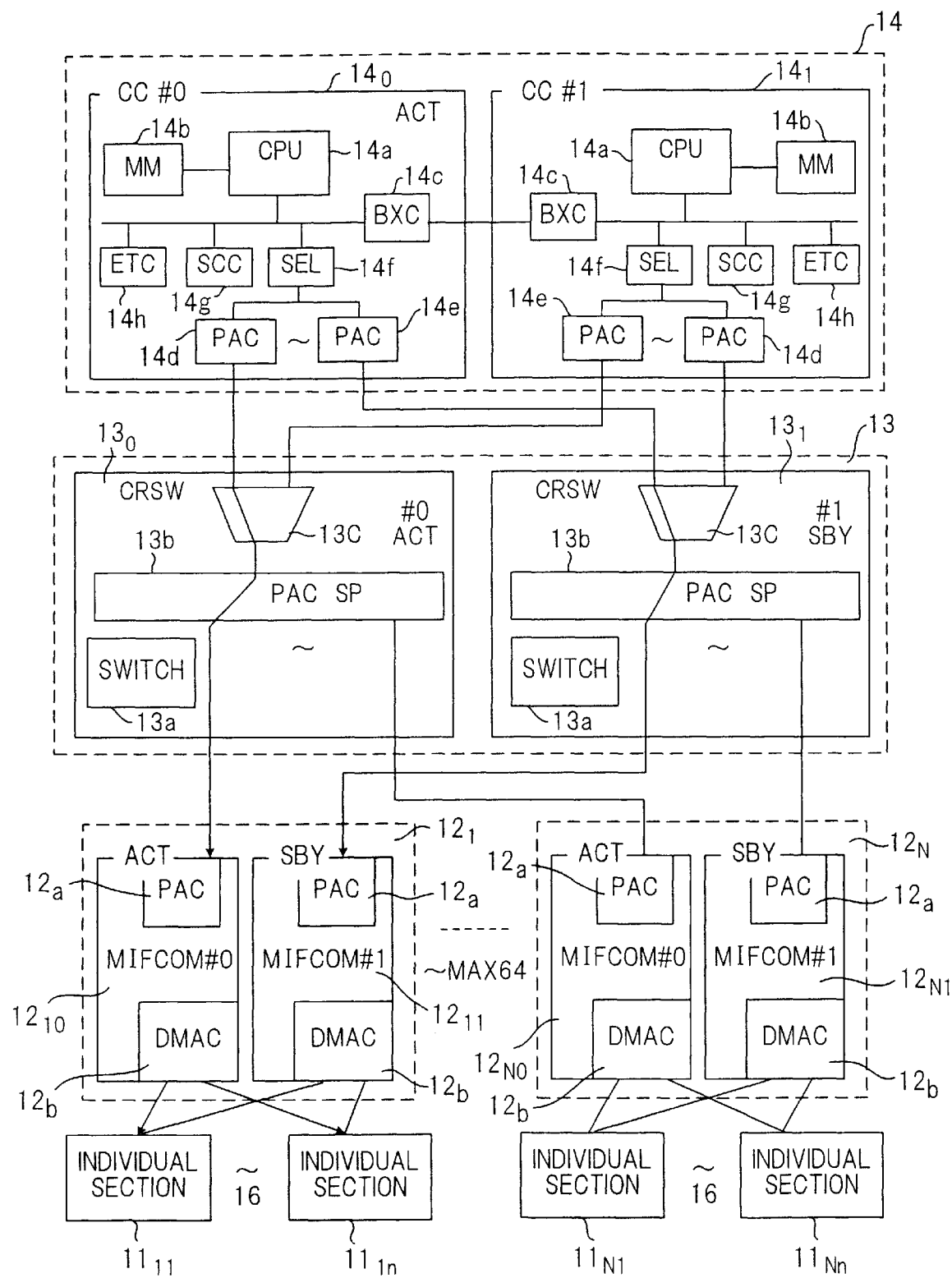
FIG. 19 is an explanatory view of the communication paths between processors in the ATM exchange system.
Figure 20:
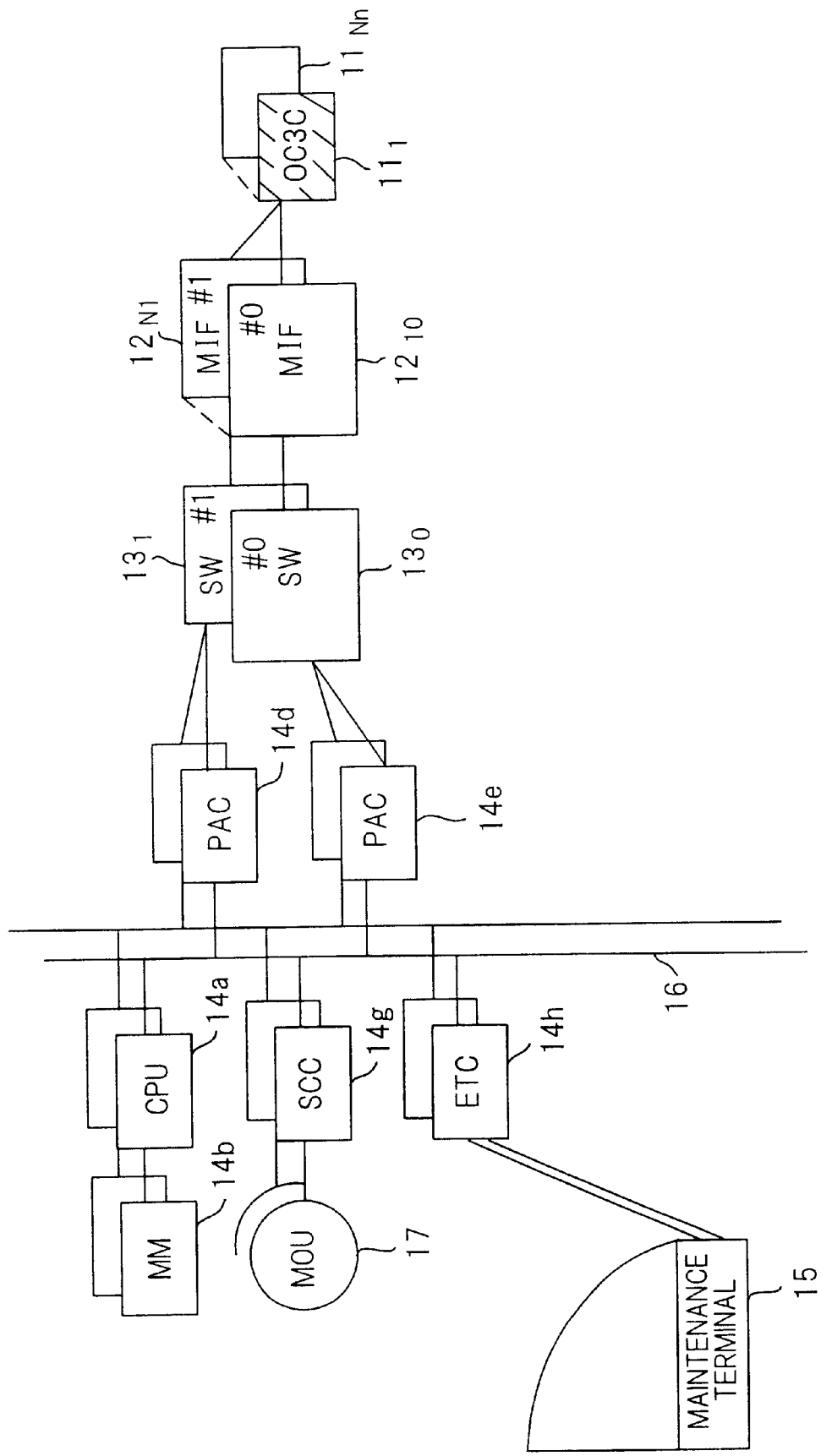
FIG. 20 shows a simplified structure of the exchange system shown in FIG. 19.

FIG. 17 is a flowchart of a package growth/shift process based on traffic information.

The monitor statistical conditions register 102c (FIG. 1) sets monitor conditions so that a shift start command is output when, for example, the cell count value (average value) of a predetermined shelf per day reaches 80% of the total cell count value of the exchange (step 401).

The information collector 102a periodically collects the amount of passed cell (cell count value) from each package (step 402), and the information calculator/analyzer 102e calculates the average value per day and per shelf and the total value of all the passed cells of the apparatus from the collected cell count values, and creates the rank list of the amount of cell in the shelves and in the packages (step 403). Judgement is then made as to whether or not the cell count value exceeds the set monitor condition and whether or not there is uneven cell traffic (steps 404, 405).

If the average cell count value of the shelf #2 reaches 80% of the total count value of the apparatus, and the amount of cell of the package #B is especially large at the steps 404, 405, the uneven cell traffic is informed to the operator, and the list of shelves to which the package #B may be shifted is displayed on the screen (step 406). In the list, the growth of a new package is also contained as an alternative.

If the package A on the shelf #1 is selected as the shelf to which the package #B is shifted (step 407), the shift procedure scenario is created and displayed on the screen (step 408). The subsequent shift process is the same as the process shown in FIG. 16. That is, the line data of the package #A on the shelf #1 and the package #B on the shelf #2 are stored in the temporary storage file 104i (step 409), and creates the line data on the corresponding shelves to which the packages #A and #B are to be shifted (step 410). The line data on the original shelves are eliminated (step 411). If the elimination is confirmed to be NG, the line data in the temporary storage file 104i are reset (steps 412, 413), and the process is finished. On the other hand, if the elimination is confirmed to be OK, the equipment control data and the equipment layer data of the package #A on the shelf #1 and the package #1 on the shelf #2 are stored in the temporary storage file 104i (step 409), and the respective data are eliminated (steps 414, 425).

If the elimination is confirmed to be NG (step 416), the line data and the equipment control data stored in the temporary storage file 104i are reset (step 413), and the process is finished. On the other hand, if the elimination is confirmed to be OK, the removal of the package #A on the shelf #1 and the package #B on the shelf #2, and the installation of the package #B on the shelf #1 and the package #A on the shelf #1 are instructed (step 417). After the installation of the packages #Am, #B in this manner, the package growth/shift process is executed (step 418). Thereafter, the line data are switched over to the respective line data on the corresponding new shelves which have been set at the step 410. Judgement is made as to whether or not the shift procedure is finished (step 420), and if the answer is YES, the shift process is finished.

As described above, according to the present invention, since it is not necessary to prepare operation data before capacity growth/degrowth/shift in an exchange, and the operator can set and eliminate operation data with easiness and certainty only by dealing with the displayed instruction and confirmation, it is possible to prevent a trouble in a conventional system such as the stop of service due to an error in the creation of operation data.

According to the present invention, when the accommodation conditions are not satisfied because a package is installed at a wrong position or the like, it is possible to easily deal with the case by outputting an error message.

According to the present invention, when line data is set, since a method is selected from a method of setting line data in the form of a menu, a method of setting line data by using a default value and a method of setting line data by using the precedingly input data, and line data is set by the selected method, it is possible to interactively set line data with easiness free from an error.

According to the present invention, since the traffic information on each package is collected and whether or not there is uneven traffic is judged on the basis of the collected traffic state, and when there is uneven traffic, the package to be shifted is specified or a new package growth is instructed, and a shift process or a growth process is interactively executed, it is possible to disperse the traffic in each shelf and to prevent an error.

As many apparently widely different embodiments of the present invention can be made without departing from the spirit and scope thereof, it is to be understood that the invention is not limited too the specific embodiments thereof except as defined in the appended claims.

What is claimed is:

1. A package growth method for installing a new package in an exchange, said method comprising the steps of:
   registering accommodation conditions data under which said exchange accommodates a package;
   registering various processes necessary for package growth;
   recording growth scenario data for specifying a package type and processes necessary for package growth, in each package;
   judging whether or not a package satisfies said accommodation conditions by identifying a position at which said package is installed and said package type when said package is newly installed in said exchange;
   creating and registering a growth procedure scenario using said processes specified by said growth scenario data recorded in said package, if said package satisfies said accommodation conditions; and
   executing a package growth process in accordance with said growth procedure scenario.

2. A package growth method according to claim 1, wherein
   said accommodation conditions data include a correct position at which said package may be installed.

3. A package growth method according to claim 1, further comprising of the step of:
   outputting an error message when said accommodation conditions are not satisfied.

4. A package growth method according to claim 1, further comprising the steps of:
   interactively selecting one method from among setting line data in the form of a menu, setting said line data by using a default value and setting said line data by using precedingly input data when it is necessary to set said line data in said package growth process; and
   setting said line data by the selected method.

5. A package degrowth method for removing a package in an exchange, said method comprising the steps of:
   registering various processes necessary for package growth for installing a new package in the exchange;
   recording growth scenario data for specifying a package type and processes necessary for package growth, in each package;
   inputting a block command for blocking a package to be removed;
   creating a degrowth procedure scenario by converting reversely a growth procedure scenario which is created using processes specified by said growth scenario data recorded in said package to be removed;
   executing a package degrowth process in accordance with said degrowth procedure scenario thereby eliminating data set by a package growth process; and
   instructing the removal of said package to be removed after eliminating said data.

6. A package degrowth method according to claim 5, wherein
   said growth procedure scenario is registered in correspondence with said package identification data at a time of package growth.

7. A package shift method for shifting a package to another position of an exchange, said method comprising the steps of:
   registering various processes necessary for package growth;
   recording growth scenario data for specifying a package type and a process necessary for package growth, in each package;
   inputting a block command for blocking a package to be shifted;
   creating a degrowth procedure scenario by converting reversely a growth procedure scenario which is created using processes specified by said growth scenario data recorded in said package to be removed;
   executing a package degrowth process in accordance with said degrowth procedure scenario thereby eliminating data set by a package growth process;

instructing the removal of said package and the installation of said package to a designated position after eliminating said data; and executing a package growth process in accordance with said growth procedure scenario after shifting said package.

8. A method for deciding to grow a new package in an exchange, the method comprising the steps of:

collecting the a traffic state of one or more packages currently in the exchange;

judging whether or not there is uneven traffic on the basis of the collected traffic state of each current package; and deciding to grow a new package in the exchange when traffic is judged to be uneven.

9. A package growth method for installing a new package in an exchange comprising the steps of:

collecting a traffic state of each of one or more packages currently in the exchange;

judging whether or not there is uneven traffic on the basis of the collected traffic state of each current package; and executing a package growth process:

wherein said step of executing a package growth process includes:

registering accommodation conditions data under which said exchange accommodates a package;

registering one or more processes necessary for package growth;

recording growth scenario data for specifying a package type and at least one process necessary for package growth, in said new package;

judging whether or not said new package satisfies said accommodation conditions by identifying a position at which said new package to be installed in said exchange and said package type when said new package is installed at said position in said exchange;

creating and registering a growth procedure scenario using said at least one process specified by said growth scenario data recorded in said new package, if said package satisfies said accommodation conditions; and executing a package growth process in accordance with said growth procedure scenario.

10. A method for deciding to shift a package among positions of an exchange, said method comprising the steps of:

collecting a traffic state of each of one or more packages currently in the exchange;

judging whether or not there is uneven traffic on the basis of the collected traffic state of each package; and specifying a package to be shifted and deciding to shift the specified package from a current position in the exchange to another position in the exchange when there is uneven traffic.

11. A package shift method for shifting a package among positions of an exchange, said method comprising the steps of:

collecting a traffic state of each of one or more packages currently in the exchange;

judging whether or not there is uneven traffic on the basis of the collected traffic state of each current package;

specifying a package to be shifted, instructing the shift of the specified package when there is uneven traffic; and executing a package shift process;

wherein said step of executing a package shift process includes:

registering one or more processes necessary for package growth;

recording growth scenario data for specifying a package type and at least one process necessary for package growth, in each package;

inputting a block command for blocking a package to be shifted;

creating a degrowth procedure scenario by converting reversely a growth procedure scenario which is created using said at least one package growth process specified by said growth scenario data recorded in said package to be shifted;

executing a package degrowth process in accordance with said degrowth procedure scenario thereby eliminating a data set produced by said at least one package growth process; instructing the removal of said package from the current position, and shifting and installation of said package to another position in said exchange after eliminating said data set; and executing said at least one package growth process in accordance with said growth procedure scenario after shifting said package.

12. A package growth method for installing a new package in an exchange which is provided with a plurality of frames as physical equipment, each frame including plural layers of shelves, each shelf including a plurality of packages, said method comprising the steps of:

registering accommodation conditions data under which said exchange accommodates a package, the accommodation condition data indicating a correspondence between a shelf and a type of package to be installed in this shelf;

registering various processes necessary for package growth;

recording a package type and growth scenario data for specifying processes necessary for package growth, in each package;

judging whether or not a package satisfies said accommodation conditions by identifying a shelf at which said package is installed and said package type when said package is newly installed in said exchange;

creating and registering a growth procedure scenario using said processes specified by said growth scenario data recorded in said package, if said package satisfies said accommodation conditions; and executing a package growth process in accordance with said growth procedure scenario.

13. A package growth method for installing a new package in an exchange which is provided with a plurality of frames as physical equipment, each frame including plural layers of shelves, each shelf including a plurality of packages, said method comprising the steps of:

collecting the traffic state of each package;

judging whether or not there is uneven traffic on the basis of the collected traffic state of each package;

instructing the growth of a new package, when there is uneven traffic; and executing a package growth process, wherein said package growth process comprises the steps of:

registering accommodations conditions data under which said exchange accommodates a package, the accommodations condition data indicating a correspondence between a shelf and a type of package to be installed in this shelf, registering various processes necessary for package growth, recording a package type and growth scenario data for specifying processes necessary for package growth, in each package, judging whether or not a package satisfies said accommodation conditions by identifying a shelf at which said package is installed and said package type when said package is newly installed in said exchange, creating and registering a growth procedure scenario using said processes specified by said growth scenario data recorded in said package, if said package satisfies said accommodation conditions; and executing a package growth in accordance with said growth procedure scenario.

* * * * *